US010866681B2

(12) United States Patent
Oh et al.

(10) Patent No.: US 10,866,681 B2
(45) Date of Patent: Dec. 15, 2020

(54) DISPLAY DEVICE, ELECTRONIC DEVICE INCLUDING DISPLAY DEVICE, AND PRESSURE SENSING METHOD THEREFOR

(71) Applicant: Samsung Electronics Co., Ltd., Gyeonggi-do (KR)

(72) Inventors: Ji Woong Oh, Seoul (KR); Jeong Seob Kim, Daegu (KR); Hyung Sup Byeon, Gyeonggi-do (KR); Sung Ho Son, Gyeonggi-do (KR); Jung Won Kim, Gyeonggi-do (KR); Eun Sung Cho, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/325,654

(22) PCT Filed: Jun. 16, 2017

(86) PCT No.: PCT/KR2017/006357
§ 371 (c)(1),
(2) Date: Feb. 14, 2019

(87) PCT Pub. No.: WO2018/038368
PCT Pub. Date: Mar. 1, 2018

(65) Prior Publication Data
US 2019/0204958 A1    Jul. 4, 2019

(30) Foreign Application Priority Data

Aug. 22, 2016  (KR) .................... 10-2016-0106359

(51) Int. Cl.
*G09G 5/00*         (2006.01)
*G06F 3/041*        (2006.01)
(Continued)

(52) U.S. Cl.
CPC .............. *G06F 3/044* (2013.01); *G06F 3/041* (2013.01); *G06F 2203/04105* (2013.01)

(58) Field of Classification Search
None
See application file for complete search history.

(56) References Cited

U.S. PATENT DOCUMENTS

| 7,538,760 B2 | 5/2009 | Hotelling et al. |
| 7,920,129 B2 | 4/2011 | Hotelling et al. |
| (Continued) | | |

FOREIGN PATENT DOCUMENTS

| CN | 105487703 | 4/2016 |
| KR | 1020130126228 | 11/2013 |
| (Continued) | | |

OTHER PUBLICATIONS

PCT/ISA/210 Search Report issued on PCT/KR2017/006357, pp. 5.
(Continued)

*Primary Examiner* — Carl Adams
(74) *Attorney, Agent, or Firm* — The Farrell Law Firm, P.C.

(57) ABSTRACT

An electronic apparatus according to various embodiments of the present disclosure includes a housing including a first surface facing in a first direction and a second surface facing in a second direction opposite to the first direction, a first touch screen display arranged between the first and second surfaces and exposed to an outside through the first surface, a second touch screen display arranged between the first and second surfaces and exposed to an outside through the second surface, and at least one pressure sensor arranged between the first and second touch screen displays to sense a pressure of an external object on at least one of the first and second touch screen displays. In addition, other embodiments are possible.

14 Claims, 15 Drawing Sheets

(51) Int. Cl.
*G06F 3/14* (2006.01)
*G06F 3/044* (2006.01)

(56) References Cited

U.S. PATENT DOCUMENTS

| | | | |
|---|---|---|---|
| 8,810,524 B1* | 8/2014 | Rosenberg | G06F 1/1694 |
| | | | 345/173 |
| 8,884,890 B2 | 11/2014 | Hotelling et al. | |
| 9,040,851 B2 | 5/2015 | Krumpelman | |
| 9,069,404 B2 | 6/2015 | Hotelling et al. | |
| 9,075,095 B2 | 7/2015 | Kallassi et al. | |
| 9,075,491 B2 | 7/2015 | Hotelling et al. | |
| 9,367,279 B2 | 6/2016 | Kim et al. | |
| 9,377,892 B2 | 6/2016 | Kim et al. | |
| 9,454,255 B2 | 9/2016 | El Kallassi et al. | |
| 9,465,502 B2 | 10/2016 | Hotelling et al. | |
| 9,836,160 B2 | 12/2017 | Hotelling et al. | |
| 9,898,161 B2 | 2/2018 | Han et al. | |
| 2007/0229464 A1 | 10/2007 | Hotelling et al. | |
| 2008/0158183 A1 | 7/2008 | Hotelling et al. | |
| 2009/0231305 A1 | 9/2009 | Hotelling et al. | |
| 2011/0181549 A1 | 7/2011 | Hotelling et al. | |
| 2013/0293444 A1* | 11/2013 | Sano | G06F 3/1446 |
| | | | 345/1.3 |
| 2014/0034469 A1 | 2/2014 | Krumpelman | |
| 2014/0035942 A1* | 2/2014 | Yun | G06F 1/1637 |
| | | | 345/592 |
| 2014/0085214 A1* | 3/2014 | Cok | G06F 3/044 |
| | | | 345/173 |
| 2014/0201653 A1 | 7/2014 | Han et al. | |
| 2014/0238152 A1 | 8/2014 | Kallassi et al. | |
| 2014/0333857 A1 | 11/2014 | Hotelling et al. | |
| 2014/0375596 A1 | 12/2014 | Kim et al. | |
| 2015/0268772 A1 | 9/2015 | Hotelling et al. | |
| 2015/0268784 A1 | 9/2015 | Kallassi et al. | |
| 2015/0286332 A1 | 10/2015 | Hotelling et al. | |
| 2015/0301665 A1 | 10/2015 | Kim et al. | |
| 2016/0109973 A1 | 4/2016 | Kim et al. | |
| 2017/0003817 A1 | 1/2017 | Hotelling et al. | |
| 2017/0024047 A1 | 1/2017 | Kung | |
| 2018/0101275 A1 | 4/2018 | Hotelling et al. | |
| 2019/0101997 A1 | 4/2019 | Kim et al. | |

FOREIGN PATENT DOCUMENTS

| | | |
|---|---|---|
| KR | 1020140091296 | 7/2014 |
| KR | 1020140147473 | 12/2014 |
| KR | 1020150121443 | 10/2015 |

OTHER PUBLICATIONS

PCT/ISA/237 Written Opinion issued on PCT/KR2017/006357, pp. 7.

European Search Report dated Aug. 2, 2019 issued in counterpart application No. 17843788.5-1231, 9 pages.

* cited by examiner ial Application No. PCT/KR2017/006357 which was
DISPLAY DEVICE, ELECTRONIC DEVICE INCLUDING DISPLAY DEVICE, AND PRESSURE SENSING METHOD THEREFOR

PRIORITY

This application is a National Phase Entry of PCT International Application No. PCT/KR2017/006357 which was filed on Jun. 16, 2017, and claims priority to Korean Patent Application No. 10-2016-0106359, which was filed on Aug. 22, 2016, the content of each of which is incorporated herein by reference.

TECHNICAL FIELD

The present disclosure relates to a method of sensing a pressure by an external object.

BACKGROUND ART

In recent years, as mobile communication technology has been developed, electronic apparatuses are changed into a form that is capable of being easily portable and freely connected to a wired or wireless network. For example, an electronic apparatus such as a smartphone or a tablet PC may support a wide variety of functions depending on an installed application program as well as call and message transmission/reception functions.

In order for an electronic apparatus to support various functions described above, an interaction technique with a user have been developed, and in recent years, the spread of a touch screen capable of receiving an intuitive input of a user for contents displayed on a display has been expanded. In addition, when the touch screen includes a pressure sensor, the touch screen may provide various input schemes and functions according to a touch and pressure of a user.

DISCLOSURE

Technical Problem

The above-described touch screen may have a structure in which a plurality of panels are stacked. When a plurality of touch screens are included in both surfaces of an electronic apparatus, the thickness of the electronic apparatus may be increased according to the stacked structure.

Aspects of the present disclosure is to provide a display apparatus of which the thickness is reduced even when a plurality of touch screens are arranged on both surface of the display apparatus, an electronic apparatus including the display apparatus, and a pressure sensing method thereof.

Technical Solution

In accordance with one aspect of the present disclosure, an electronic apparatus includes a housing including a first surface facing in a first direction and a second surface facing in a second direction opposite to the first direction, a first touch screen display arranged between the first and second surfaces and exposed to an outside through the first surface, a second touch screen display arranged between the first and second surfaces and exposed to an outside through the second surface, and at least one pressure sensor arranged between the first and second touch screen displays to sense a pressure of an external object on at least one of the first and second touch screen displays.

In accordance with another aspect of the present disclosure, a display apparatus includes a first touch screen display facing in a first direction, a second touch screen display facing in a second direction opposite to the first direction, and at least one pressure sensor arranged between the first and second touch screen displays to sense a pressure of an external object on at least one of the first and second touch screen displays.

In accordance with still another aspect of the present disclosure, a method of sensing a pressure of an electronic apparatus, which includes activating a first touch screen display facing in a first direction and a second touch screen display facing in a second direction opposite to the first direction, sensing a touch on the first touch screen display, deactivating the second touch screen display, determining whether a touch is sensed by the first touch screen display, determining whether a pressure is sensed by at least one pressure sensor arranged between the first and second touch screen displays, and determining a direction in which the pressure is sensed, based on a touch sensing result and a pressure sensing result.

Advantageous Effects

According to various embodiments, it is possible to reduce the thicknesses of the display apparatus and the electronic apparatus even when the plurality of touch screens are arranged on both surface of the display apparatus. In addition, even when only one pressure sensor is included to reduce the thicknesses of the display apparatus and the electronic apparatus, it is possible to determine a direction in which the pressure is detected.

MODE FOR INVENTION

Figure 1:
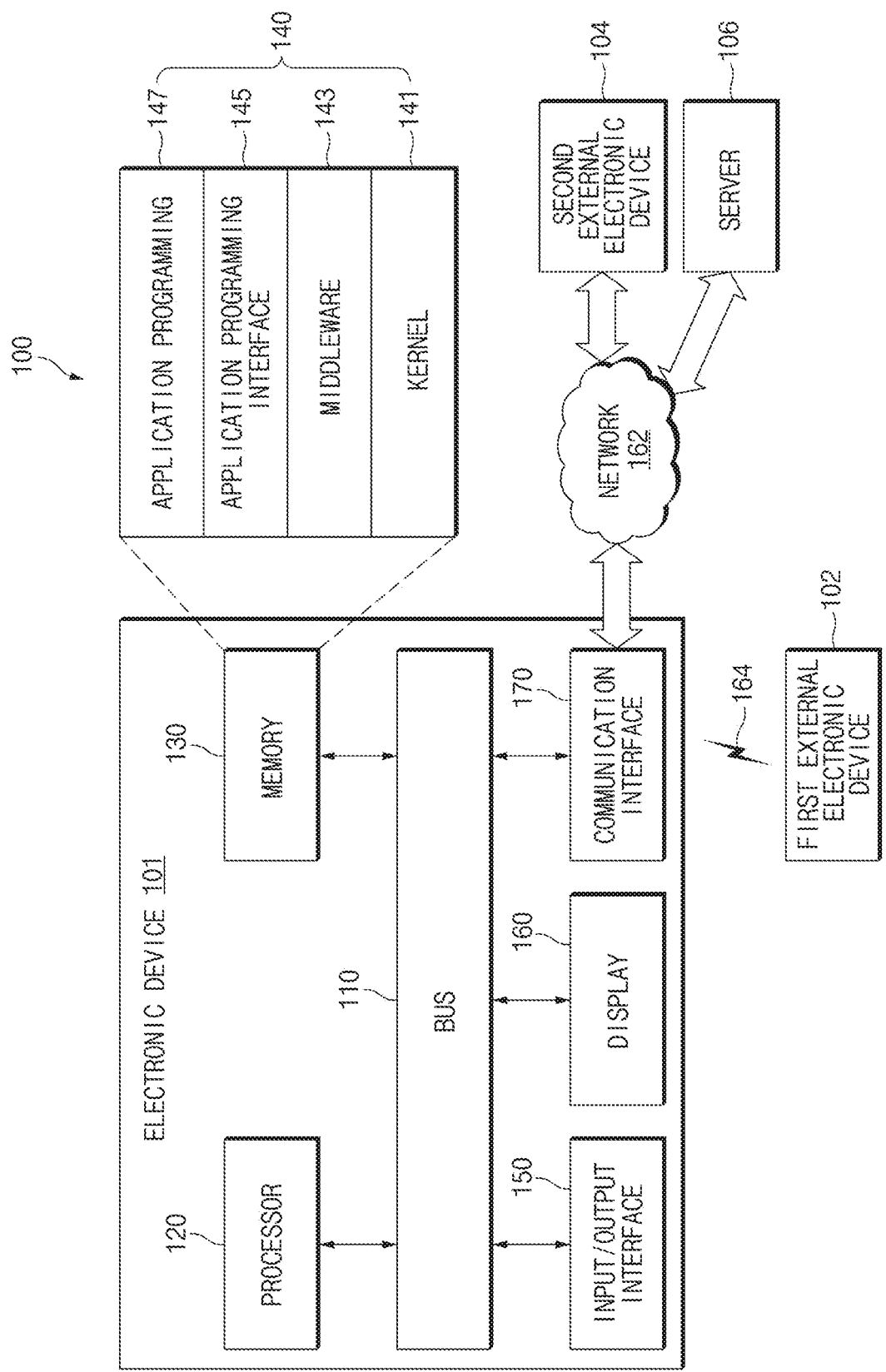
FIG. 1 illustrates an electronic apparatus according to various embodiments.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the present disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the present disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the present disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the present disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the present disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the present disclosure. In some cases, even if terms are terms which are defined in the present disclosure, they may not be interpreted to exclude embodiments of the present disclosure.

An electronic apparatus according to various embodiments of the present disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic apparatus may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic apparatus may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic apparatus may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic apparatus may be one of the above-described devices or a combination thereof. An electronic apparatus according to an embodiment may be a flexible electronic apparatus. Furthermore, an electronic apparatus according to an embodiment of the present disclosure may not be limited to the above-described electronic apparatuses and may include other electronic apparatuses and new electronic apparatuses according to the development of technologies.

Hereinafter, electronic apparatuses according to various embodiments will be described with reference to the accompanying drawings. In the present disclosure, the term "user" may refer to a person who uses an electronic apparatus or may refer to an apparatus (e.g., an artificial intelligence electronic apparatus) that uses the electronic apparatus.

FIG. 1 illustrates an electronic apparatus, according to various embodiments.

Referring to FIG. 1, an electronic apparatus 101, 102, or 104, or a server 106 in a network environment 100 may be connected each other over a network 162 or a short range communication 164. The electronic apparatus 101 may include a bus 110, a processor 120, a memory 130, an input/output interface 150, a display 160, and a communication interface 170. According to an embodiment, the electronic apparatus 101 may not include at least one of the above-described components or may further include other component(s).

For example, the bus 110 may interconnect the above-described components 110 to 170 and may include a circuit for conveying communications (e.g., a control message and/or data) among the above-described components.

The processor 120 may include one or more of a central processing unit (CPU), an application processor (AP), or a communication processor (CP). For example, the processor 120 may perform an arithmetic operation or data processing associated with control and/or communication of at least other components of the electronic apparatus 101.

The memory 130 may include a volatile and/or nonvolatile memory. For example, the memory 130 may store commands or data associated with at least one other component(s) of the electronic apparatus 101. According to an embodiment, the memory 130 may store software and/or a program 140. The program 140 may include, for example, a kernel 141, a middleware 143, an application programming interface (API) 145, and/or an application program (or "an application") 147. At least a part of the kernel 141, the middleware 143, or the API 145 may be referred to as an "operating system (OS)".

For example, the kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete components of the electronic apparatus 101 so as to control or manage system resources.

The middleware 143 may perform, for example, a mediation role such that the API 145 or the application program 147 communicates with the kernel 141 to exchange data. Furthermore, the middleware 143 may process task requests received from the application program 147 according to a priority. For example, the middleware 143 may assign the priority, which makes it possible to use a system resource (e.g., the bus 110, the processor 120, the memory 130, or the like) of the electronic apparatus 101, to at least one of the application program 147. For example, the middleware 143 may process the one or more task requests according to the priority assigned to the at least one, which makes it possible to perform scheduling or load balancing on the one or more task requests.

The API 145 may be, for example, an interface through which the application program 147 controls a function provided by the kernel 141 or the middleware 143, and may include, for example, at least one interface or function (e.g., an instruction) for a file control, a window control, image processing, a character control, or the like.

The input/output interface 150 may play a role, for example, of an interface which transmits a command or data input from a user or another external device, to other component(s) of the electronic apparatus 101. Furthermore, the input/output interface 150 may output a command or data, received from other component(s) of the electronic apparatus 101, to a user or another external device.

The display 160 may include, for example, a liquid crystal display (LCD), a light-emitting diode (LED) display, an organic LED (OLED) display, a microelectromechanical systems (MEMS) display, or an electronic paper display. The display 160 may display, for example, various contents (e.g., a text, an image, a video, an icon, a symbol, and the like) to a user. The display 160 may include a touch screen and may receive, for example, a touch, gesture, proximity, or hovering input using an electronic pen or a part of a user's body.

For example, the communication interface 170 may establish communication between the electronic apparatus 101 and an external device (e.g., the first external electronic apparatus 102, the second external electronic apparatus 104, or the server 106). For example, the communication interface 170 may be connected to the network 162 over wireless communication or wired communication to communicate with the external device (e.g., the second external electronic apparatus 104 or the server 106).

The wireless communication may include cellular communication using at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. According to an embodiment, the wireless communication may include, for example, at least one of wireless fidelity (Wi-Fi), Bluetooth, Bluetooth low energy (BLE), Zigbee, near field communication (NFC), magnetic secure transmission (MST), a radio frequency (RF), a body area network (BAN), a global navigation satellite system (GNSS), or the like.

The MST may generate a pulse in response to transmission data using an electromagnetic signal, and the pulse may generate a magnetic field signal. The electronic apparatus 101 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in the present disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 162 may include at least one of telecommunications networks, for example, a computer network (e.g., LAN or WAN), an Internet, or a telephone network.

Each of the first and second external electronic apparatuses 102 and 104 may be a device of which the type is different from or the same as that of the electronic apparatus 101. According to an embodiment, the server 106 may include a group of one or more servers. According to various embodiments, all or a portion of operations that the electronic apparatus 101 will perform may be executed by another or plural electronic apparatuses (e.g., the first external electronic apparatus 102, the second external electronic apparatus 104 or the server 106). According to an embodiment, in the case where the electronic apparatus 101 executes any function or service automatically or in response to a request, the electronic apparatus 101 may not perform the function or the service internally, but, alternatively additionally, it may request at least a portion of a function associated with the electronic apparatus 101 from another device (e.g., the first external electronic apparatus 102, the second external electronic apparatus 104 or the server 106). The other electronic apparatus (e.g., the first external electronic apparatus 102, the second external electronic apparatus 104 or the server 106) may execute the requested function or additional function and may transmit the execution result to the electronic apparatus 101. The electronic apparatus 101 may provide the requested function or service using the received result or may additionally process the received result to provide the requested function or service. To this end, for example, cloud computing, distributed computing, or client-server computing may be used.

Figure 2:
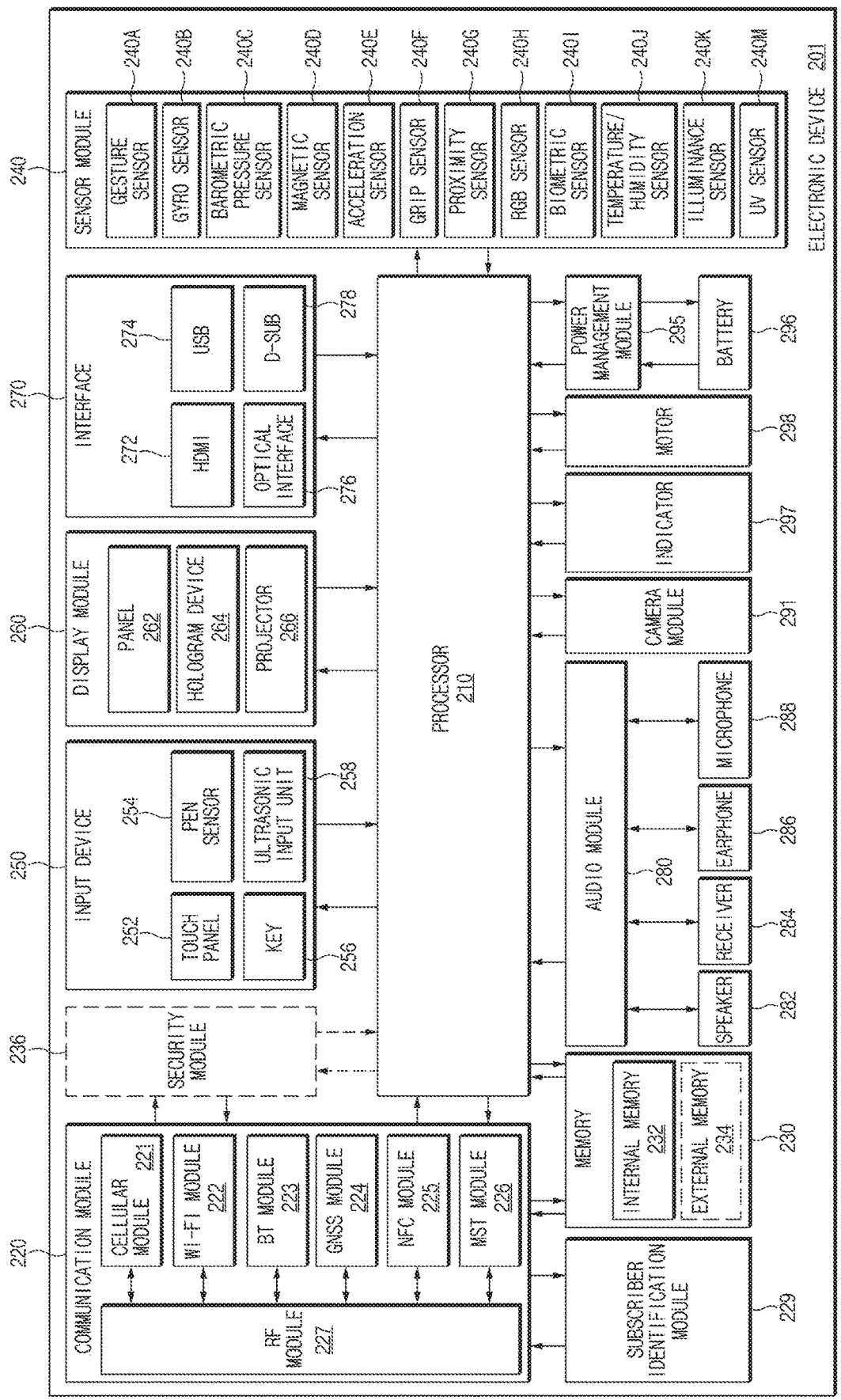
FIG. 2 illustrates a block diagram of an electronic apparatus according to various embodiments.

FIG. 2 illustrates a block diagram of an electronic apparatus, according to various embodiments.

Referring to FIG. 2, an electronic apparatus 201 may include, for example, all or a part of the electronic apparatus 101 illustrated in FIG. 1. The electronic apparatus 201 may include one or more processors (e.g., an application processor (AP)) 210, a communication module 220, a subscriber identification module 229, a memory 230, a sensor module 240, an input device 250, a display 260, an interface 270, an audio module 280, a camera module 291, a power management module 295, a battery 296, an indicator 297, and a motor 298.

The processor 210 may drive, for example, an operating system (OS) or an application to control a plurality of hardware or software components connected to the processor 210 and may process and compute a variety of data. For example, the processor 210 may be implemented with a System on Chip (SoC). According to an embodiment, the processor 210 may further include a graphic processing unit (GPU) and/or an image signal processor. The processor 210 may include at least a part (e.g., a cellular module 221) of components illustrated in FIG. 2. The processor 210 may load a command or data, which is received from at least one of other components (e.g., a nonvolatile memory), into a volatile memory and process the loaded command or data. The processor 210 may store a variety of data in the nonvolatile memory.

The communication module 220 may be configured the same as or similar to the communication interface 170 of FIG. 1. The communication module 220 may include the cellular module 221, a Wi-Fi module 222, a Bluetooth (BT) module 223, a GNSS module 224 (e.g., a GPS module, a Glonass module, a Beidou module, or a Galileo module), a near field communication (NFC) module 225, a MST module 226 and a radio frequency (RF) module 227.

The cellular module 221 may provide, for example, voice communication, video communication, a character service, an Internet service, or the like over a communication network. According to an embodiment, the cellular module 221 may perform discrimination and authentication of the electronic apparatus 201 within a communication network by using the subscriber identification module (e.g., a SIM card) 229. According to an embodiment, the cellular module 221 may perform at least a portion of functions that the processor 210 provides. According to an embodiment, the cellular module 221 may include a communication processor (CP).

Each of the Wi-Fi module 222, the BT module 223, the GNSS module 224, the NFC module 225, or the MST module 226 may include a processor for processing data exchanged through a corresponding module, for example. According to an embodiment, at least a part (e.g., two or more) of the cellular module 221, the Wi-Fi module 222, the BT module 223, the GNSS module 224, the NFC module 225, or the MST module 226 may be included within one Integrated Circuit (IC) or an IC package.

For example, the RF module 227 may transmit and receive a communication signal (e.g., an RF signal). For example, the RF module 227 may include a transceiver, a power amplifier module (PAM), a frequency filter, a low noise amplifier (LNA), an antenna, or the like. According to another embodiment, at least one of the cellular module 221, the Wi-Fi module 222, the BT module 223, the GNSS module 224, the NFC module 225, or the MST module 226 may transmit and receive an RF signal through a separate RF module.

The subscriber identification module 229 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 230 (e.g., the memory 130) may include an internal memory 232 or an external memory 234. For example, the internal memory 232 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 234 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 234 may be operatively and/or physically connected to the electronic apparatus 201 through various interfaces.

A security module 236 may be a module that includes a storage space of which a security level is higher than that of the memory 230 and may be a circuit that guarantees safe data storage and a protected execution environment. The security module 236 may be implemented with a separate circuit and may include a separate processor. For example, the security module 236 may be in a smart chip or a secure digital (SD) card, which is removable, or may include an embedded secure element (eSE) embedded in a fixed chip of the electronic apparatus 201. Furthermore, the security module 236 may operate based on an operating system (OS) that is different from the OS of the electronic apparatus 201. For example, the security module 236 may operate based on java card open platform (JCOP) OS.

The sensor module 240 may measure, for example, a physical quantity or may detect an operation state of the electronic apparatus 201. The sensor module 240 may convert the measured or detected information to an electric signal. For example, the sensor module 240 may include at least one of a gesture sensor 240A, a gyro sensor 240B, a barometric pressure sensor 240C, a magnetic sensor 240D, an acceleration sensor 240E, a grip sensor 240F, the proximity sensor 240G, a color sensor 240H (e.g., red, green, blue (RGB) sensor), a biometric sensor 240I, a temperature/humidity sensor 240J, an illuminance sensor 240K, or an UV sensor 240M. Although not illustrated, additionally or alternatively, the sensor module 240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one or more sensors included therein. According to an embodiment, the electronic apparatus 201 may further include a processor that is a part of the processor 210 or independent of the processor 210 and is configured to control the sensor module 240. The processor may control the sensor module 240 while the processor 210 remains at a sleep state.

The input device 250 may include, for example, a touch panel 252, a (digital) pen sensor 254, a key 256, or an ultrasonic input unit 258. For example, the touch panel 252 may use at least one of capacitive, resistive, infrared and ultrasonic detecting methods. Also, the touch panel 252 may further include a control circuit. The touch panel 252 may further include a tactile layer to provide a tactile reaction to a user.

The (digital) pen sensor 254 may be, for example, a part of a touch panel or may include an additional sheet for recognition. The key 256 may include, for example, a physical button, an optical key, a keypad, or the like. The ultrasonic input device 258 may detect (or sense) an ultrasonic signal, which is generated from an input device, through a microphone (e.g., a microphone 288) and may check data corresponding to the detected ultrasonic signal.

The display 260 (e.g., the display 160) may include a panel 262, a hologram device 264, or a projector 266. The panel 262 may be the same as or similar to the display 160 illustrated in FIG. 1. The panel 262 may be implemented, for example, to be flexible, transparent or wearable. The panel 262 and the touch panel 252 may be integrated into a single module. The hologram device 264 may display a stereoscopic image in a space using a light interference phenomenon. The projector 266 may project light onto a screen so as to display an image. For example, the screen may be arranged in the inside or the outside of the electronic apparatus 201. According to an embodiment, the touch panel 252 may include a pressure sensor (or force sensor, interchangeably used hereinafter) that measures the intensity of touch pressure by a user. The pressure sensor may be implemented integrally with the touch panel 252, or may be implemented as at least one sensor separately from the touch panel 252. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) 278. The interface 270 may be included, for example, in the communication interface 170 illustrated in FIG. 1. Additionally or alternatively, the interface 270 may include, for example, a mobile high definition link (MHL) interface, a SD card/multi-media card (MMC) interface, or an infrared data association (IrDA) standard interface.

The audio module 280 may convert a sound and an electric signal in dual directions. At least a component of the audio module 280 may be included, for example, in the input/output interface 150 illustrated in FIG. 1. The audio module 280 may process, for example, sound information that is input or output through a speaker 282, a receiver 284, an earphone 286, or the microphone 288.

For example, the camera module 291 may shoot a still image or a video. According to an embodiment, the camera module 291 may include at least one or more image sensors (e.g., a front sensor or a rear sensor), a lens, an image signal processor (ISP), or a flash (e.g., an LED or a xenon lamp).

The power management module 295 may manage, for example, power of the electronic apparatus 201. According to an embodiment, a power management integrated circuit (PMIC), a charger IC, or a battery or fuel gauge may be included in the power management module 295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specific state of the electronic apparatus 201 or a part thereof (e.g., the processor 210), such as a booting state, a message state, a charging state, and the like. The motor 298 may convert an electrical signal into a mechanical vibration and may generate the following effects: vibration, haptic, and the like. Although not illustrated, a processing device (e.g., a GPU) for supporting a mobile TV may be included in the electronic apparatus 201. The processing device for supporting the mobile TV may process media data according to the standards of digital multimedia broadcasting (DMB), digital video broadcasting (DVB), MediaFlo™, or the like.

Each of the above-mentioned components of the electronic apparatus according to various embodiments of the present disclosure may be configured with one or more parts, and the names of the components may be changed according to the type of the electronic apparatus. In various embodiments, the electronic apparatus may include at least one of the above-mentioned components, and some components may be omitted or other additional components may be added. Furthermore, some of the components of the electronic apparatus according to various embodiments may be combined with each other so as to form one entity, so that the functions of the components may be performed in the same manner as before the combination.

Figure 3:
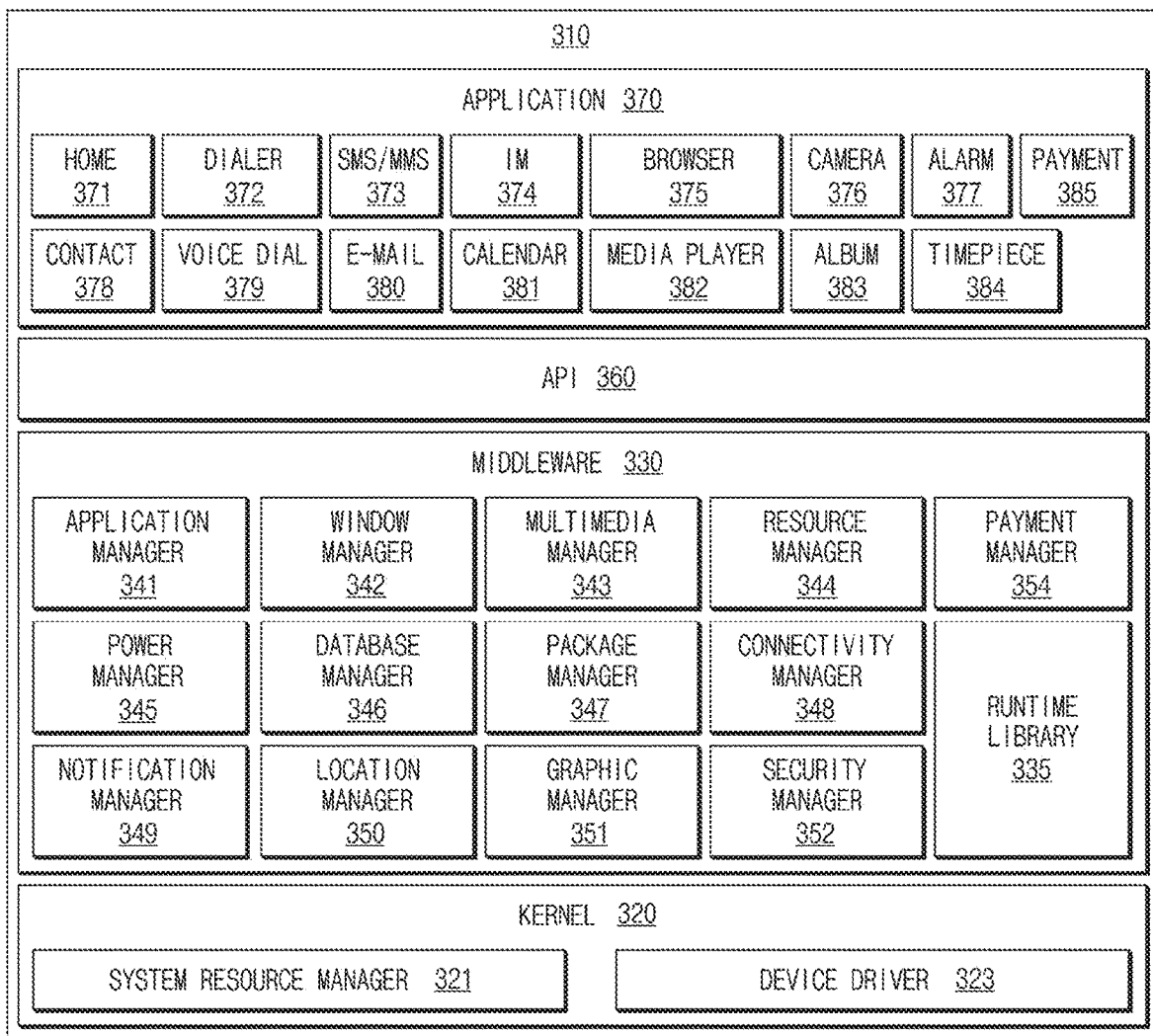
FIG. 3 illustrates a block diagram of a program module according to various embodiments.

FIG. 3 illustrates a block diagram of a program module, according to various embodiments.

According to an embodiment, a program module 310 (e.g., the program 140) may include an operating system (OS) to control resources associated with an electronic apparatus (e.g., the electronic apparatus 101), and/or diverse applications (e.g., the application program 147) driven on the OS. The OS may be, for example, Android™ iOS™, Windows™, Symbian™, Tizen™, or Bada™.

The program module 310 may include a kernel 320, a middleware 330, an application programming interface (API) 360, and/or an application 370. At least a portion of the program module 310 may be preloaded on an electronic apparatus or may be downloadable from an external electronic apparatus (e.g., the electronic apparatus 102 or 104, the server 106, or the like).

The kernel 320 (e.g., the kernel 141) may include, for example, a system resource manager 321 or a device driver 323. The system resource manager 321 may perform control, allocation, or retrieval of system resources. According to an embodiment, the system resource manager 321 may include a process managing unit, a memory managing unit, or a file system managing unit. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

The middleware 330 may provide, for example, a function that the application 370 needs in common, or may provide diverse functions to the application 370 through the API 360 to allow the application 370 to efficiently use limited system resources of the electronic apparatus. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module that is used by a compiler to add a new function through a programming language while the application 370 is being executed. The runtime library 335 may perform input/output management, memory management, or capacities about arithmetic functions.

The application manager 341 may manage, for example, a life cycle of at least one application of the application 370. The window manager 342 may manage a graphic user interface (GUI) resource that is used in a screen. The multimedia manager 343 may identify a format necessary for playing diverse media files, and may perform encoding or decoding of media files by using a codec suitable for the format. The resource manager 344 may manage resources such as a storage space, memory, or source code of at least one application of the application 370. The power manager 345 may operate, for example, with a basic input/output system (BIOS) to manage a battery or power, and may provide power information for an operation of an electronic apparatus. The database manager 346 may generate, search for, or modify database that is to be used in at least one application of the application 370. The package manager 347 may install or update an application that is distributed in the form of package file. The connectivity manager 348 may manage, for example, wireless connection such as Wi-Fi or Bluetooth. The notification manager 349 may display or notify an event such as arrival message, appointment, or proximity notification in a mode that does not disturb a user. The location manager 350 may manage location information about an electronic apparatus. The graphic manager 351 may manage a graphic effect that is provided to a user, or manage a user interface relevant thereto. The security manager 352 may provide a general security function necessary for system security, user authentication, or the like. According to an embodiment, in the case where an electronic apparatus (e.g., the electronic apparatus 101) includes a telephony function, the middleware 330 may further include a telephony manager for managing a voice or video call function of the electronic apparatus.

The middleware 330 may include a middleware module that combines diverse functions of the above-described components. The middleware 330 may provide a module specialized to each OS kind to provide differentiated functions. Additionally, the middleware 330 may dynamically remove a part of the preexisting components or may add new components thereto.

The API 360 (e.g., the API 145) may be, for example, a set of programming functions and may be provided with a configuration that is variable depending on an OS. For example, in the case where an OS is Android™ or iOS™, it may provide one API set per platform. In the case where an OS is Tizen™, it may provide two or more API sets per platform.

The application 370 (e.g., the application program 147) may include, for example, one or more applications capable of providing functions for a home 371, a dialer 372, an SMS/MMS 373, an instant message (IM) 374, a browser 375, a camera 376, an alarm 377, a contact 378, a voice dial 379, an e-mail 380, a calendar 381, a media player 382, an album 383, or a timepiece 384 or for offering health care (e.g., measuring an exercise quantity, blood sugar, or the like) or environment information (e.g., information of barometric pressure, humidity, temperature, or the like).

According to an embodiment, the application 370 may include an application (hereinafter referred to as "information exchanging application" for descriptive convenience) to support information exchange between an electronic apparatus (e.g., the electronic apparatus 101) and an external electronic apparatus (e.g., the first external electronic apparatus 102 or the second external electronic apparatus 104). The information exchanging application may include, for example, a notification relay application for transmitting specific information to an external electronic apparatus, or a device management application for managing the external electronic apparatus.

For example, the notification relay application may include a function of transmitting notification information, which arise from other applications (e.g., applications for SMS/MMS, e-mail, health care, or environmental information), to an external electronic apparatus (e.g., the first external electronic apparatus 102 or the second external electronic apparatus 104). Additionally, the notification relay application may receive, for example, notification information from an external electronic apparatus and provide the notification information to a user.

The device management application may manage (e.g., install, delete, or update), for example, at least one function (e.g., turn-on/turn-off of an external electronic apparatus itself (or a part) or adjustment of brightness (or resolution) of a display) of the external electronic apparatus (e.g., the first external electronic apparatus 102 or the second external electronic apparatus 104) which communicates with the electronic apparatus, an application running in the external electronic apparatus, or a service (e.g., a call service, a message service, or the like) provided from the external electronic apparatus.

According to an embodiment, the application 370 may include an application (e.g., a health care application of a mobile medical device) that is assigned in accordance with an attribute of an external electronic apparatus (e.g., the first external electronic apparatus 102 or the second external electronic apparatus 104). According to an embodiment, the application 370 may include an application that is received from an external electronic apparatus (e.g., the first external electronic apparatus 102, the second external electronic apparatus 104, or the server 106). According to an embodiment, the application 370 may include a preloaded application or a third party application that is downloadable from a server. The names of components of the program module 310 according to the embodiment may be modifiable depending on kinds of operating systems.

According to various embodiments, at least a portion of the program module 310 may be implemented by software, firmware, hardware, or a combination of two or more thereof. At least a portion of the program module 310 may be implemented (e.g., executed), for example, by the processor (e.g., the processor 210). At least a portion of the program module 310 may include, for example, modules, programs, routines, sets of instructions, processes, or the like for performing one or more functions.

Figure 4:
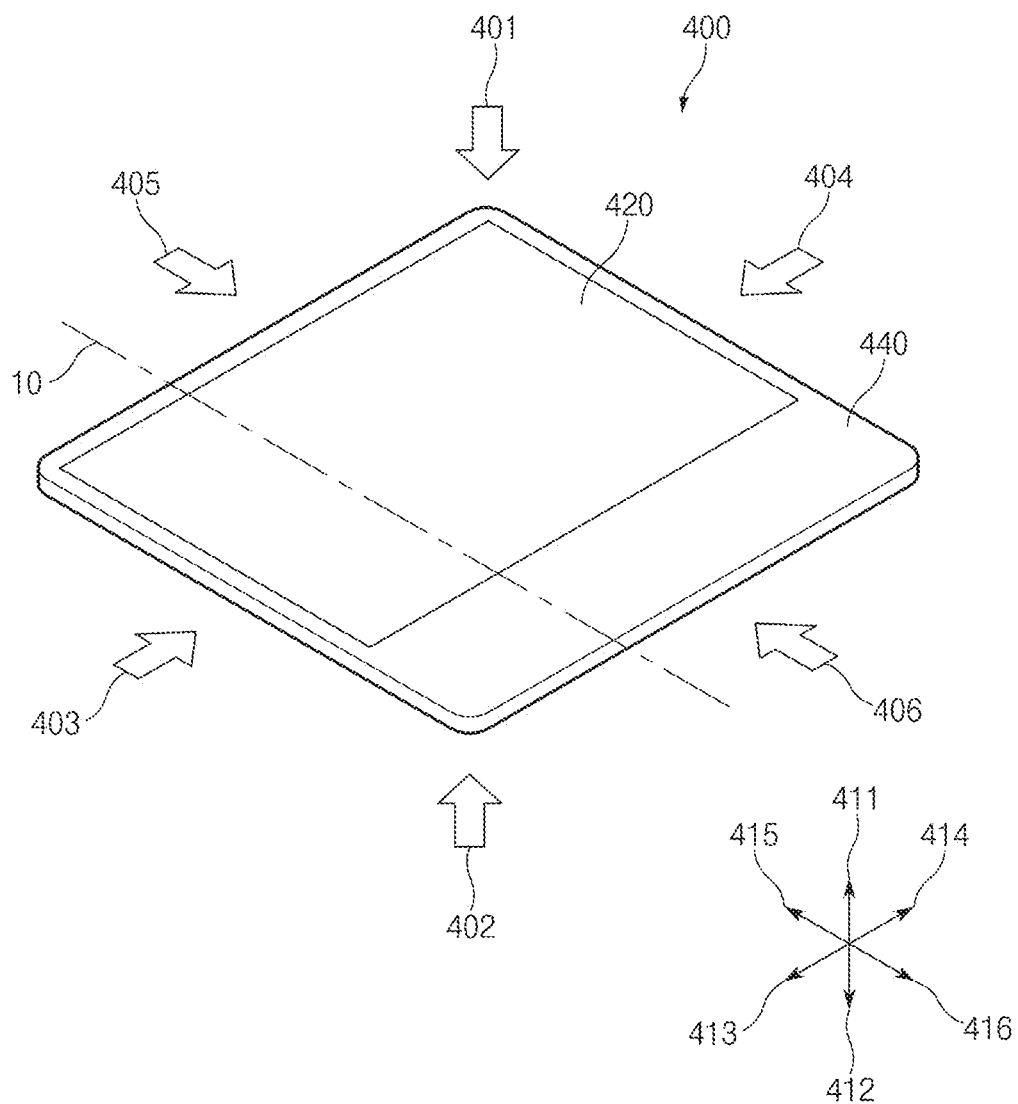
FIG. 4 illustrates an appearance of an electronic apparatus according to an embodiment.

FIG. 4 illustrates an appearance of an electronic apparatus according to an embodiment.

Referring to FIG. 4, an electronic apparatus 400 according to various embodiments of the present disclosure may include a display (or display apparatus) 420 and a housing 440. Various circuits or modules such as a processor, a memory, and the like may be arranged in the electronic apparatus 400 (or the housing 440).

According to various embodiments, the display 420 may be arranged on front and rear surfaces of the electronic apparatus 400. For example, the display 420 may be arranged between a front surface (a first surface) 401 facing in an upper direction (a first direction) 411 and a rear surface (a second surface) 402 facing in a lower direction (a second direction) 412, and may be exposed to an outside through the front and rear surfaces 401 and 402.

According to various embodiments, the display 420 may output contents (e.g., text, images, video, icons, widgets, symbols, or the like), or may receive a touch input (including a touch, hovering, or "force touch"). To this end, the display 420 may include, for example, a cover glass, a display panel, a touch panel, a fingerprint sensor, and/or a pressure sensor. The cover glass, the display panel, the touch panel, the fingerprint sensor, and or the pressure sensor may be arranged to be stacked with corresponding areas (e.g., substantially the same area).

According to various embodiments, the housing 440 may form at least a portion of the appearance of the electronic apparatus 400. For example, the housing 440 may include the front surface 401 facing in the upper direction 411, the rear surface 402 facing the front surface 401, and a side surface surrounding at least a partial space between the front and rear surfaces 401 and 402. The side surface may include a left side surface 403 facing in a left-side direction 413, a right side surface 404 facing in a right-side direction 414, an upper side surface 405 facing in an upper-side direction 415, and a lower-side surface 406 facing in a bottom-side direction 416.

According to various embodiments, the housing 440 may be formed of a plastic injection material, a conductive material (e.g., metal), or a combination thereof, to protect various components within the electronic apparatus 400 from external impacts or dust.

According to an embodiment, the housing 440 may refer to the outer surfaces of a plurality of components. For example, the front surface of the housing 440 may correspond to a cover glass, and the side surface of the housing 440 may correspond to a side member of a rear case (or a rear plate). The rear surface of the housing 440 may correspond to the back cover of a battery.

Figure 5:
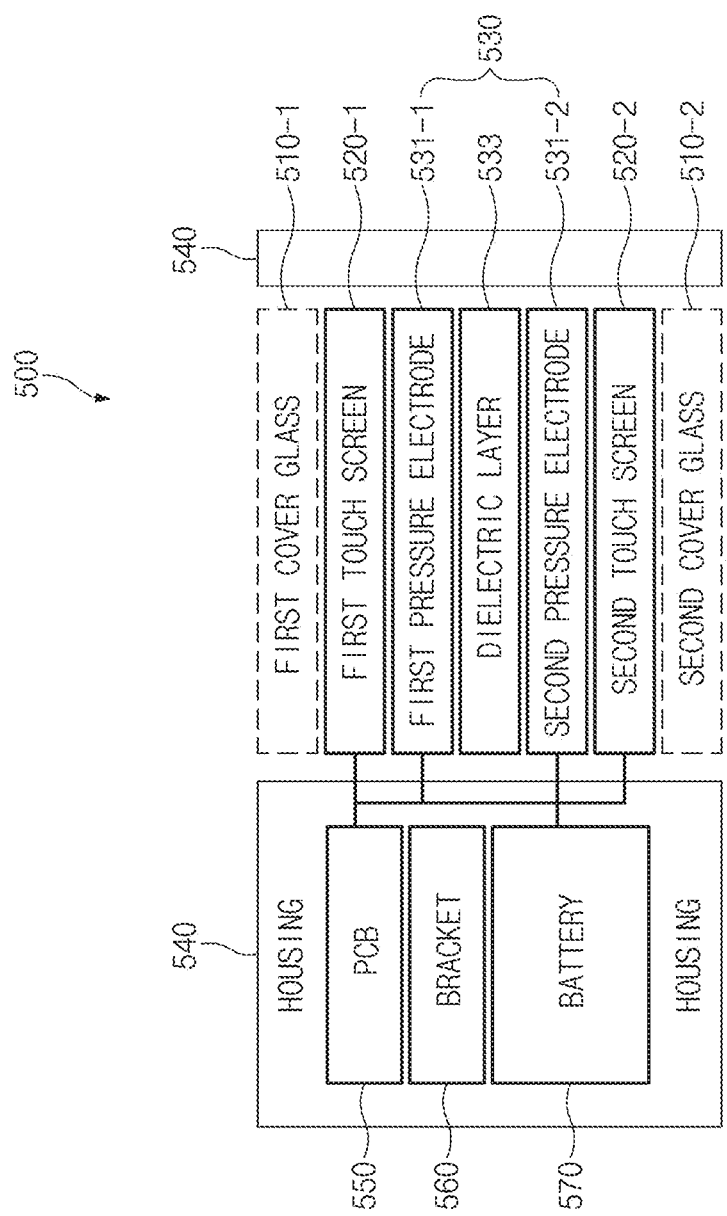
FIG. 5 is a view showing a section of an electronic apparatus according to an embodiment.

FIG. 5 is a view showing a section of an electronic apparatus according to an embodiment.

According to various embodiments of the present disclosure, a section of an electronic apparatus 500 shown in FIG. 5 may be one example of a section of the electronic apparatus 400 of FIG. 4 when viewed from the right-side direction 414 to the left-side direction 413 after taken along a line 10 crossing in the upper direction 415 and the lower direction 416. Referring to FIG. 5, the electronic apparatus 500 may include a first cover glass 510-1, a second cover glass 510-2, a first touch screen (or a first touch screen display) 520-1, a second touch screen (or a second touch screen display) 520-2, a pressure sensor 530, a housing 540, a printed circuit board (PCB) 550, a bracket 560, and a battery 570.

According to an embodiment, the first cover glass 510-1 may be arranged on a front surface (or a first surface) facing in an upper direction (or a first direction) of the electronic apparatus 500. According to an embodiment, the second cover glass 510-2 may be arranged on a rear surface (or a second surface) facing in a lower direction (or a second direction) of the electronic apparatus 500. According to an embodiment, the first and second cover glasses 510-1 and 510-2 may be formed of a transparent material. For example, the first and second cover glasses 510-1 and 510-2 may be formed of a material such as glass, a transparent polymer, or the like.

According to an embodiment, the first touch screen 520-1 may be arranged between the front and rear surfaces of the electronic apparatus 500. For example, the first touch screen 520-1 may be arranged between the first and second cover glasses 510-1 and 510-2 (or downward from the first cover glass 510-1). According to an embodiment, the first touch screen 520-1 may be exposed to an outside through the front surface of the electronic apparatus 500. According to an embodiment, although not shown in FIG. 5, the first touch screen 520-1 may include a display panel and a touch panel. The touch panel may include at least one touch electrode. The first touch screen 520-1 may display an image through the display panel, and may sense a touch input which is input into a front surface through the touch panel.

According to an embodiment, the second touch screen 520-2 may be arranged between the front and rear surfaces of the electronic apparatus 500. For example, the second touch screen 520-2 may be arranged between the first and second cover glasses 510-1 and 510-2 (or upward from the second cover glass 510-2). According to an embodiment, although not shown in FIG. 5, the second touch screen 520-2 may be exposed to an outside through the rear surface of the electronic apparatus 500. According to an embodiment, the second touch screen 520-2 may include a display panel and a touch panel. The touch panel may include at least one touch electrode. The second touch screen 520-2 may display an image through the display panel, and may sense a touch input to the rear surface through the touch panel.

According to an embodiment, the first touch screen 520-1 may at least partially overlap the second touch screen 520-2 when the front surface of the electronic apparatus 500 is viewed from above the electronic apparatus 500. For example, the first touch screen 520-1 may have the same area as the second touch screen 520-2 and overlap the entire second touch screen 520-2.

According to an embodiment, the pressure sensor 530 may be arranged between the first and second touch screens 520-1 and 520-2. The pressure sensor 530 may sense the pressure of an external object (e.g., a user's finger, a stylus pen, or the like) on at least one of the first and second touch screens 520-1 and 520-2. According to an embodiment, the pressure sensor 530 may be a capacitive pressure sensor. For example, the pressure sensor 530 may be a mutual capacitance type pressure sensor.

According to an embodiment, the pressure sensor 530 may include a first pressure electrode 531-1, a second pressure electrode 531-2, and a dielectric layer 533. According to an embodiment, the pressure sensor 530 may apply a voltage to the first or second pressure electrode 531-1 or 531-2, and may sense the pressure of an external object based on the capacitance (or a variation in capacitance) formed between the first and second pressure electrodes 531-1 and 531-2 by the applied voltage.

According to an embodiment, the first pressure electrode 531-1 may be arranged in parallel with the first touch screen 520-1. The first pressure electrode 531-1 may be arranged between the first touch screen 520-1 and the dielectric layer 533. According to an embodiment, the second pressure electrode 531-2 may be arranged in parallel with the second touch screen 520-2. The second pressure electrode 531-2 may be arranged between the second touch screen 520-2 and the dielectric layer 533. According to an embodiment, the first and second pressure electrodes 531-1 and 531-2 may be formed in a film form. According to an embodiment, the first and second pressure electrodes 531-1 and 531-2 may be formed to be transparent or opaque. When the first and second pressure electrodes 531-1 and 531-2 are formed to be transparent, for example, the first and second pressure electrodes 531-1 and 531-2 may include at least one of indium tin oxide (ITO), indium zinc oxide (IZO), silver (Ag) nanowire, metal mesh, transparent polymer conductor, and graphene. When the first and second pressure electrodes 531-1 and 531-2 are formed to be transparent, for example, the first and second pressure electrodes 531-1 and 531-2 may include at least one of copper (Cu), silver (Ag), magnesium (Mg), titanium (Ti), and graphene.

According to an embodiment, the dielectric layer 533 may be arranged between the first and second pressure electrodes 531-1 and 531-2. According to an embodiment, the dielectric layer 533 may be formed of a material whose thickness varies with a pressure applied from an outside. For example, the dielectric layer 533 may include at least one of silicon, air, a foam, a membrane, optically clear adhesive (OCA), sponge, rubber, ink, and polymer. According to an embodiment, the dielectric layer 533 may have elasticity or restoration.

According to an embodiment, the housing 540 may form at least a portion of the appearance of the electronic apparatus 500. According to an embodiment, all surfaces of the electronic apparatus 500 may be surrounded by the first and second cover glasses 510-1 and 510-2, and the housing 540, and the other components of the electronic apparatus 500 may be spatially separated from an outside by the first and second cover glasses 510-1 and 510-2, and the housing 540.

According to an embodiment, the PCB 550 may electrically connect each component included in the electronic apparatus 500. For example, the PCB 550 may transfer power from the battery 570 to each component included in the electronic apparatus 500. As another example, the PCB 550 may transmit control signals, data, or the like between the components included in the electronic apparatus 500.

According to an embodiment, the bracket 560 may be contained in the electronic apparatus 500 (or the housing 540) to physically fix each component included in the electronic apparatus 500. According to an embodiment, the bracket 560 may be formed of a material having high rigidity such as metal to secure the rigidity of the electronic apparatus 500.

According to an embodiment, the battery 570 may supply power to each component included in the electronic apparatus 500. According to an embodiment, the battery 570 may include a rechargeable battery (e.g., a lithium-ion battery) and/or a solar cell.

According to various embodiments, at least some of the PCB 550, the bracket 560, and the battery 570 may serve as a ground (GND) for the electronic apparatus 500. For example, the PCB 550, the bracket 560 and the battery 570 may include a metal plate serving as the ground (GND), or some of the components included in the PCB 550, the bracket 560, and the battery 570 may be electrically connected to the ground (GND) of the electronic apparatus 500.

Figure 6:
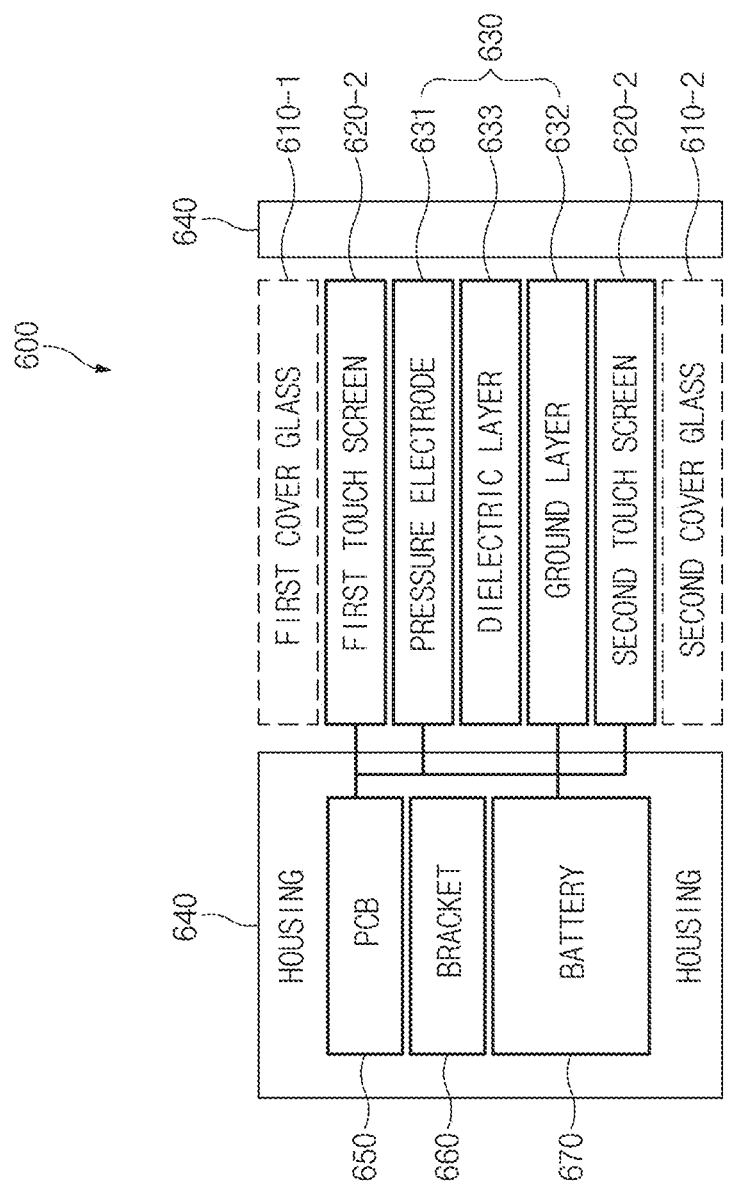
FIG. 6 is a view showing a section of an electronic apparatus according to an embodiment.

FIG. 6 is a view showing a section of an electronic apparatus according to an embodiment.

According to various embodiments of the present disclosure, a section of an electronic apparatus 600 shown in FIG. 6 may be one example of a section of the electronic apparatus 400 of FIG. 4 when viewed from the right-side direction 414 to the left-side direction 413 after taken along the line 10 crossing in the upper direction 415 and the lower direction 416. Referring to FIG. 6, the electronic apparatus 600 may include a first cover glass 610-1, a second cover glass 610-2, a first touch screen 620-1, a second touch screen 620-2, a pressure sensor 630, a housing 640, a printed circuit board (PCB) 650, a bracket 660, and a battery 670. Since the remaining components except for the pressure sensor 630 in the configuration shown in FIG. 6 are the same as or similar to those described with reference to FIG. 5, the following description will be focused on the difference of the pressure sensor 630.

According to an embodiment, the pressure sensor 630 may sense the pressure of an external object (e.g., a user's finger, a stylus pen, or the like) on at least one of the first and second touch screens 620-1 and 620-2. According to an embodiment, the pressure sensor 630 may be a capacitive pressure sensor. For example, the pressure sensor 630 may be a self-capacitance type pressure sensor.

According to an embodiment, the pressure sensor 630 may include a pressure electrode 631, a ground (GND) layer 632, and a dielectric layer 633. According to an embodiment, the pressure sensor 630 may apply a voltage to the pressure electrode 631, and may sense the pressure of an external object based on the capacitance (or a variation in capacitance) formed between the pressure electrode 631 and the ground layer 632 by the applied voltage.

According to an embodiment, the pressure electrode 631 may be arranged in parallel with the first touch screen 620-1. The pressure electrode 631 may be arranged between the first touch screen 620-1 and the dielectric layer 633. According to an embodiment, the ground layer 632 may be arranged in parallel with the second touch screen 620-2. The ground layer 632 may be arranged between the second touch screen 620-2 and the dielectric layer 633. According to an embodiment, the pressure electrode 631 and the ground layer 632 may be formed in a film form. According to an embodiment, the pressure electrode 631 and the ground layer 632 may be formed to be transparent or opaque.

According to an embodiment, the dielectric layer 633 may be arranged between the pressure electrode 631 and the ground layer 632. According to an embodiment, the dielectric layer 633 may be formed of a material whose thickness varies with a pressure applied from an outside. According to an embodiment, the dielectric layer 633 may have elasticity or restoration.

Figure 7:
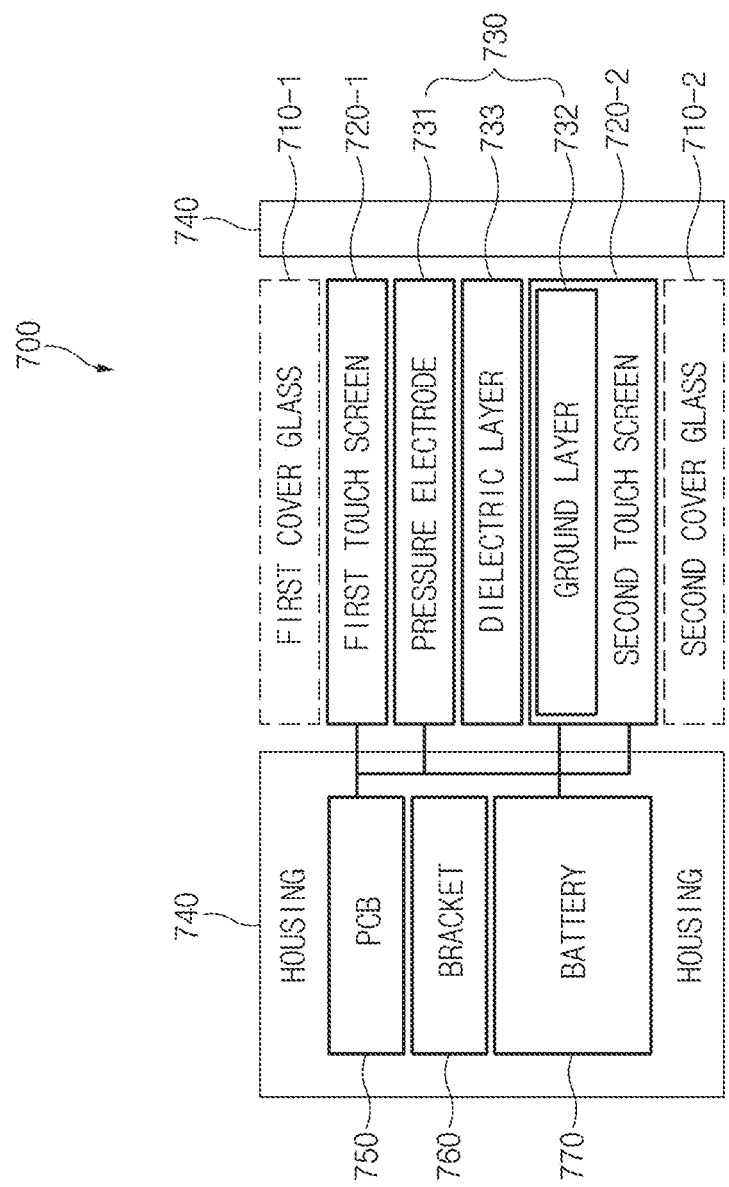
FIG. 7 is a view showing a section of an electronic apparatus according to an embodiment.

FIG. 7 is a view showing a section of an electronic apparatus according to an embodiment.

According to various embodiments of the present disclosure, a section of an electronic apparatus 700 shown in FIG. 7 may be one example of a section of the electronic apparatus 400 of FIG. 4 when viewed from the right-side direction 414 to the left-side direction 413 after taken along the line 10 crossing in the upper direction 415 and the lower direction 416. Referring to FIG. 7, the electronic apparatus 700 may include a first cover glass 710-1, a second cover glass 710-2, a first touch screen 720-1, a second touch screen 720-2, a pressure sensor 730, a housing 740, a printed circuit board (PCB) 750, a bracket 760, and a battery 770. Since the remaining components except for the pressure sensor 730 in the configuration shown in FIG. 7 are the same as or similar to those described with reference to FIG. 5, the following description will be focused on the difference of the pressure sensor 730.

According to an embodiment, the pressure sensor 730 may sense the pressure of an external object (e.g., a user's finger, a stylus pen, or the like) on at least one of the first and second touch screens 720-1 and 720-2. According to an embodiment, the pressure sensor 630 may be a capacitive pressure sensor. For example, the pressure sensor 630 may be a self-capacitance type pressure sensor.

According to an embodiment, the pressure sensor 730 may include a pressure electrode 731, a ground (GND) layer 732, and a dielectric layer 733. According to an embodiment, the pressure sensor 730 may apply a voltage to the pressure electrode 731, and may sense the pressure of an external object based on the capacitance (or a variation in capacitance) formed between the pressure electrode 731 and the ground layer 732 by the applied voltage.

According to an embodiment, the pressure electrode 731 may be arranged in parallel with the first touch screen 720-1. The pressure electrode 731 may be arranged downward from the first touch screen 720-1. According to an embodiment, the ground layer 732 may be arranged within the second touch screen 720-2. For example, the ground layer 732 may be arranged to face the dielectric layer 733 within the second touch screen 720-2. According to an embodiment, the pressure electrode 731 and the ground layer 732 may be formed in a film form. According to an embodiment, the pressure electrode 731 and the ground layer 732 may be formed to be transparent or opaque. According to an embodiment, the ground layer 732 may be included in the second touch screen 720-2. For example, the second touch screen 720-2 may include a self-capacitance type touch panel including the ground layer 732. The pressure sensor 730 may sense the pressure of an external object based on the capacitance (or a variation in capacitance) formed between the pressure electrode 731 and the ground layer 732 included in the second touch screen 720-2.

According to an embodiment, the dielectric layer 733 may be arranged between the pressure electrode 731 and the ground layer 732. According to an embodiment, the dielectric layer 733 may be formed of a material whose thickness varies with a pressure applied from an outside. According to an embodiment, the dielectric layer 733 may have elasticity or restoration.

Figure 8:
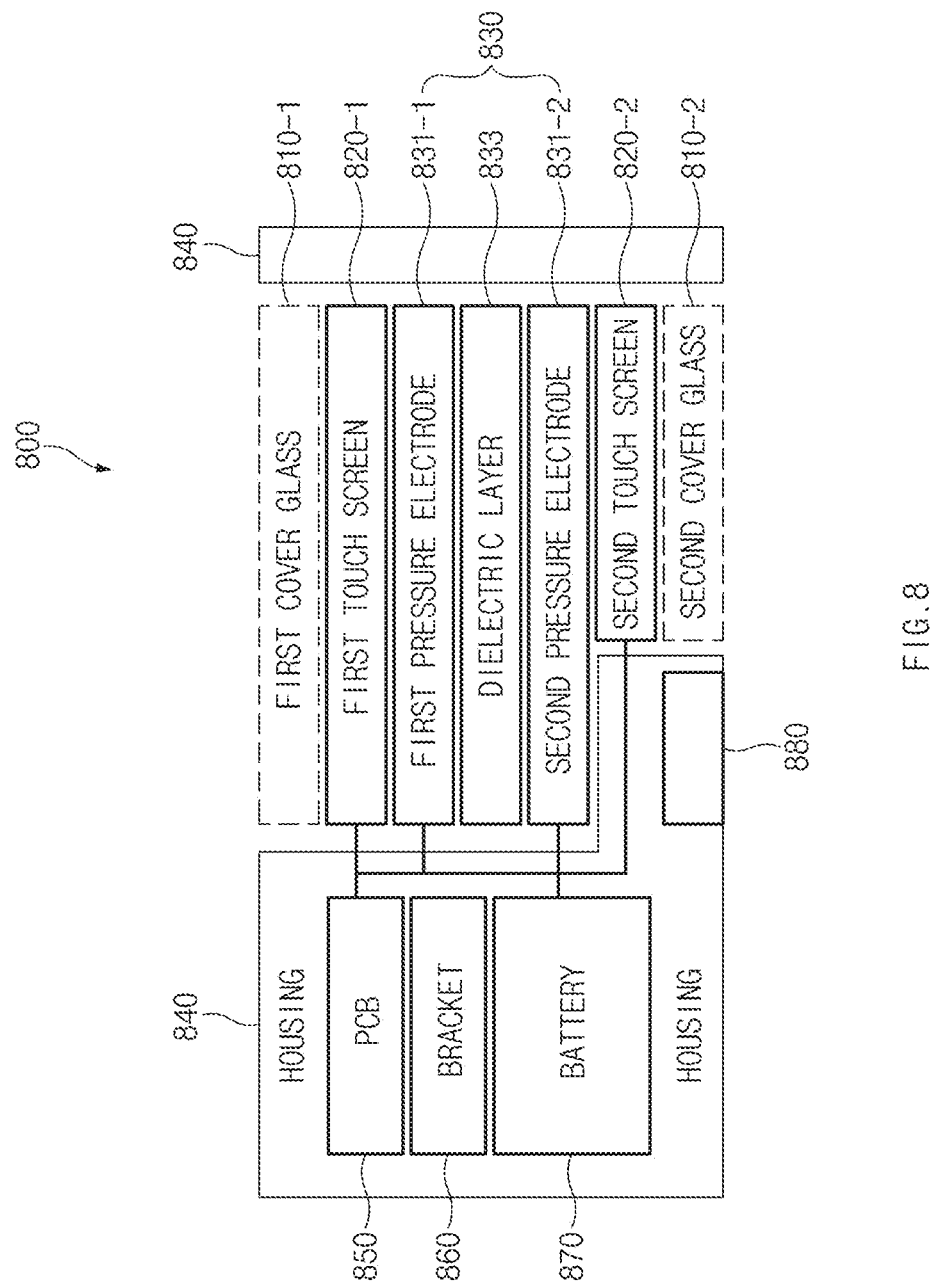
FIG. 8 is a view showing a section of an electronic apparatus according to an embodiment.

FIG. 8 is a view showing a section of an electronic apparatus according to an embodiment.

According to various embodiments of the present disclosure, a section of an electronic apparatus 800 shown in FIG. 8 may be one example of a section of the electronic apparatus 400 of FIG. 4 when viewed from the right-side direction 414 to the left-side direction 413 after taken along the line 10 crossing in the upper direction 415 and the lower direction 416. Referring to FIG. 8, the electronic apparatus 800 may include a first cover glass 810-1, a second cover glass 810-2, a first touch screen 820-1, a second touch screen 820-2, a pressure sensor 830, a housing 840, a printed circuit board (PCB) 850, a bracket 860, a battery 870, and at least one additional component 880. Since the remaining components except for the second cover glass 810-2, the second touch screen 820-2, the housing 840 and the additional component 880 in the configuration shown in FIG. 8 are the same as or similar to those described with reference to FIG. 5, the following description will be focused on the difference.

According to an embodiment, the second cover glass 810-2 may have a smaller area than the first cover glass 810-2. According to an embodiment, the second touch screen 820-2 may have a smaller area than the first touch screen 820-1. For example, the housing 840 may extend in an upper side direction on a rear surface of the electronic apparatus 800 as compared with the housing 540 of FIG. 5. As the housing 840 extends, the second cover glass 810-2 and the second touch screen 820-2 may be reduced in the upper side direction on a rear surface of the electronic apparatus 800.

According to an embodiment, the at least one additional component 880 may be included in at least a portion of the expanded area of the housing 840. The additional component 880 may be exposed to an outside through the rear surface of the electronic apparatus 800. For example, the additional component 880 may be exposed to an outside through the rear surface of the housing 840. The additional component 880 may include at least one of a camera, a fingerprint sensor, and a heart rate sensor.

According to an embodiment, the second touch screen 820-2 may at least partially overlap the first touch screen 820-1 when the rear surface of the electronic apparatus 800 is viewed in a downward direction of the electronic apparatus 800. For example, the second touch screen 820-2 may have a smaller area than the first touch screen 820-1 and may partially overlap the first touch screen 820-1.

Figure 9:
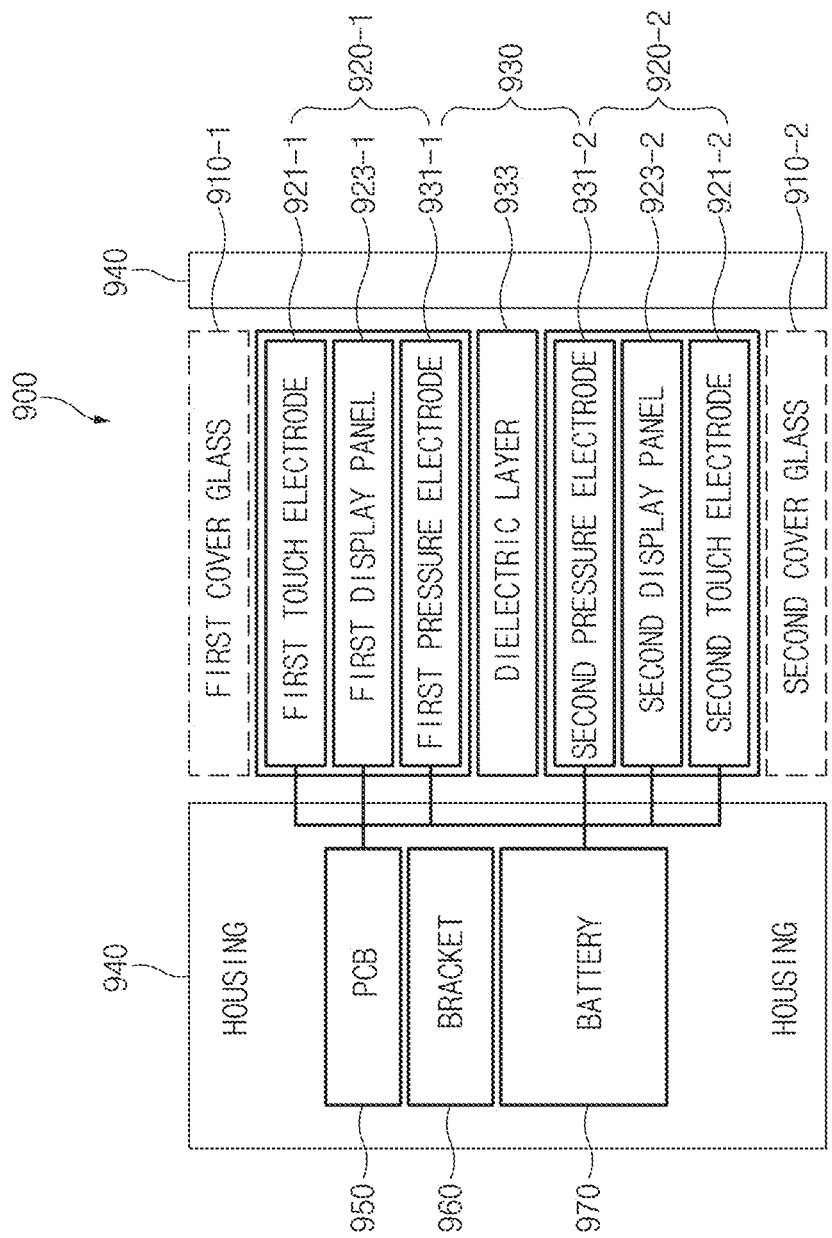
FIG. 9 is a view showing a section of an electronic apparatus according to an embodiment.

FIG. 9 is a view showing a section of an electronic apparatus according to an embodiment.

According to various embodiments of the present disclosure, a section of an electronic apparatus 900 shown in FIG. 9 may be one example of a section of the electronic apparatus 400 of FIG. 4 when viewed from the right-side direction 414 to the left-side direction 413 after taken along the line 10 crossing in the upper direction 415 and the lower direction 416. Referring to FIG. 9, the electronic apparatus 900 may include a first cover glass 910-1, a second cover glass 910-2, a first touch screen 920-1, a second touch screen 920-2, a pressure sensor 930, a housing 940, a printed circuit board (PCB) 950, a bracket 960, and a battery 970. Since the remaining components except for the first and second touch screens 920-1 and 920-2 and the pressure sensor 930 in the configuration shown in FIG. 9 are the same as or similar to those described with reference to FIG. 5, the following description will be focused on the difference.

According to an embodiment, the pressure sensor 930 may be arranged between the first and second touch screens 920-1 and 920-2. The pressure sensor 930 may sense the pressure of an external object (e.g., a user's finger, a stylus pen, or the like) on at least one of the first and second touch screens 920-1 and 920-2. According to an embodiment, the pressure sensor 930 may be a capacitive pressure sensor. For example, the pressure sensor 930 may be a mutual capacitance type pressure sensor.

According to an embodiment, the pressure sensor 930 may include a first pressure electrode 931-1, a second pressure electrode 931-2, and a dielectric layer 933. According to an embodiment, the pressure sensor 930 may apply a voltage to the first or second pressure electrode 931-1 or 931-2, and may sense the pressure of an external object based on the capacitance (or a variation in capacitance) formed between the first and second pressure electrodes 931-1 and 931-2 by the applied voltage.

According to an embodiment, the first pressure electrode 931-1 may be arranged within the first touch screen 920-1. For example, the first pressure electrode 931-1 may be arranged to face the dielectric layer 933 within the first touch screen 920-1. According to an embodiment, the second pressure electrode 931-2 may be arranged within the first touch screen 920-2. For example, the second pressure electrode 931-2 may be arranged to face the dielectric layer 933 within the second touch screen 920-2.

According to an embodiment, the first touch screen 920-1 may include a first touch electrode 921-1 and a first display panel 923-1. According to an embodiment, the first touch electrode 921-1 may be arranged to face the first pressure electrode 931-1 within the first touch screen 920-1. For example, the first touch electrode 921-1 may be arranged between the first touch screen 920-1 and the first touch glass 910-1. According to an embodiment, the first touch screen 920-1 may apply a voltage to the first touch electrode 921-1 or the first pressure electrode 931-1, and may sense the touch of an external object based on the capacitance (or a variation in capacitance) formed between the first touch electrode 921-1 and the first pressure electrode 931-1 by the applied voltage.

According to an embodiment, the second touch screen 920-2 may include a second touch electrode 921-2 and a second display panel 923-2. According to an embodiment, the second touch electrode 921-2 may be arranged to face the second pressure electrode 931-2 within the second touch screen 920-2. For example, the second touch electrode 921-2 may be arranged between the second touch screen 920-2 and the second touch glass 910-2. According to an embodiment, the second touch screen 920-2 may apply a voltage to the second touch electrode 921-2 or the second pressure electrode 931-2, and may sense the touch of an external object based on the capacitance (or a variation in capacitance) formed between the second touch electrode 921-2 and the second pressure electrode 931-2 by the applied voltage.

Figure 10:
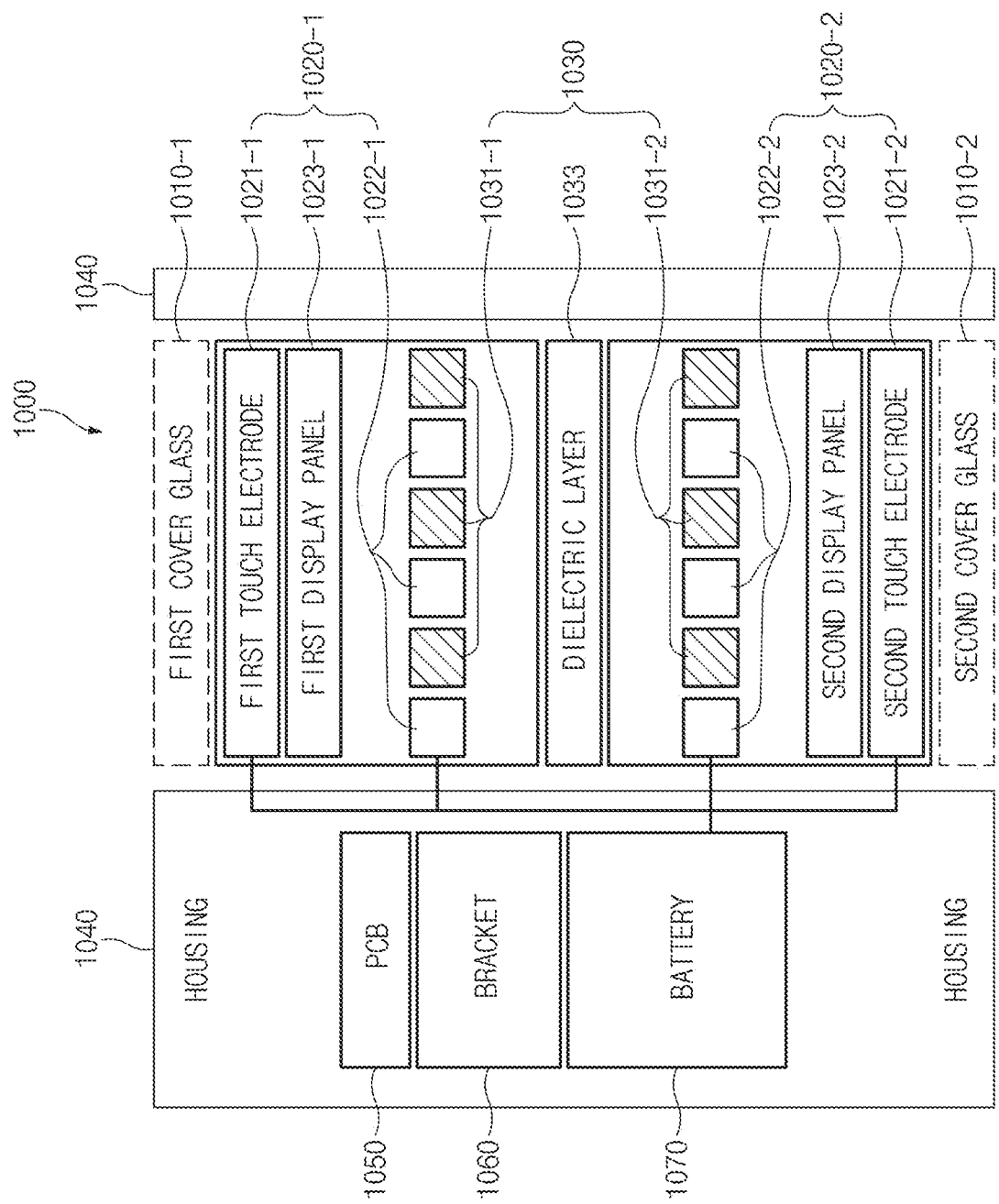
FIG. 10 is a view showing a section of an electronic apparatus according to an embodiment.

FIG. 10 is a view showing a section of an electronic apparatus according to an embodiment.

According to various embodiments of the present disclosure, a section of an electronic apparatus 1000 shown in FIG. 10 may be one example of a section of the electronic apparatus 400 of FIG. 4 when viewed from the right-side direction 414 to the left-side direction 413 after taken along the line 10 crossing in the upper direction 415 and the lower direction 416. Referring to FIG. 10, the electronic apparatus 1000 may include a first cover glass 1010-1, a second cover glass 1010-2, a first touch screen 1020-1, a second touch screen 1020-2, a pressure sensor 1030, a housing 940, a printed circuit board (PCB) 1050, a bracket 1060, and a battery 1070. Since the remaining components except for the first and second touch screens 1020-1 and 1020-2 and the pressure sensor 1030 in the configuration shown in FIG. 10 are the same as or similar to those described with reference to FIG. 5, the following description will be focused on the difference.

According to an embodiment, the pressure sensor 1030 may be arranged between the first and second touch screens 1020-1 and 1020-2. The pressure sensor 1030 may sense the pressure of an external object (e.g., a user's finger, a stylus pen, or the like) on at least one of the first and second touch screens 1020-1 and 1020-2. According to an embodiment, the pressure sensor 1030 may be a capacitive pressure sensor. For example, the pressure sensor 1030 may be a mutual capacitance type pressure sensor.

According to an embodiment, the pressure sensor 1030 may include a first pressure electrode 1031-1, a second pressure electrode 1031-2, and a dielectric layer 1033. According to an embodiment, the pressure sensor 1030 may apply a voltage to the first or second pressure electrode 1031-1 or 1031-2, and may sense the pressure of an external object based on the capacitance (or a variation in capacitance) formed between the first and second pressure electrodes 1031-1 and 1031-2 by the applied voltage.

According to an embodiment, the first pressure electrode 1031-1 may be arranged within the first touch screen 1020-1. For example, the first pressure electrode 1031-1 may be arranged to face the dielectric layer 1033 within the first touch screen. According to an embodiment, the second pressure electrode 1031-2 may be arranged within the first touch screen 1020-2. For example, the second pressure electrode 1031-2 may be arranged to face the dielectric layer 1033 within the second touch screen.

According to an embodiment, the first touch screen 1020-1 may include a plurality of first touch electrodes 1021-1 and 1022-1 and a first display panel 1023-1. For example, the first touch panel may include the upward first touch electrode 1021-1 which is arranged to face the first touch glass 1010-1 in an upper direction (e.g., facing the first pressure electrode 1031-1 within the first touch screen 1020-1) within the first touch screen 1020-1 and the downward first touch electrode 1022-1 which is arranged to face the dielectric layer 1033 in a lower direction within the first touch screen 1020-1. According to an embodiment, the downward first touch electrode 1022-1 and the first pressure electrode 1031-1 may be arranged on the same layer. For example, the downward first touch electrode 1022-1 and the first pressure electrode 1031-1 may be arranged to alternate with each other in a matrix form. According to an embodiment, the first touch screen 1020-1 may apply a voltage to the upward first touch electrode 1021-1 or the downward first touch electrode 1022-1, and may sense the touch of an external object based on the capacitance (or a variation in capacitance) formed between the upward first touch electrode 1021-1 and the downward first touch electrode 1022-1 by the applied voltage.

According to an embodiment, the second touch screen 1020-2 may include a plurality of second touch electrodes 1021-2 and 1022-2, and a second display panel 1023-2. For example, the second touch panel may include the downward second touch electrode 1021-2 which is arranged to face the second touch glass 1010-2 in a lower direction (e.g., facing the second pressure electrode 1031-2 within the second touch screen 1020-2) within the second touch screen 1020-2 and the upward second touch electrode 1022-2 which is arranged to face the dielectric layer 1033 in a upper direction within the second touch screen 1020-2. According to an embodiment, the upward second touch electrode 1022-2 and the second pressure electrode 1031-2 may be arranged on the same layer. For example, the upward second touch electrode 1022-2 and the second pressure electrode 1031-2 may be arranged to alternate with each other in a matrix form. According to an embodiment, the second touch screen 1020-2 may apply a voltage to the upward second touch electrode 1022-2 or the downward first touch electrode 1021-2, and may sense the touch of an external object based on the capacitance (or a variation in capacitance) formed between the upward second touch electrode 1022-2 and the downward first touch electrode 1021-2 by the applied voltage.

Figure 11:
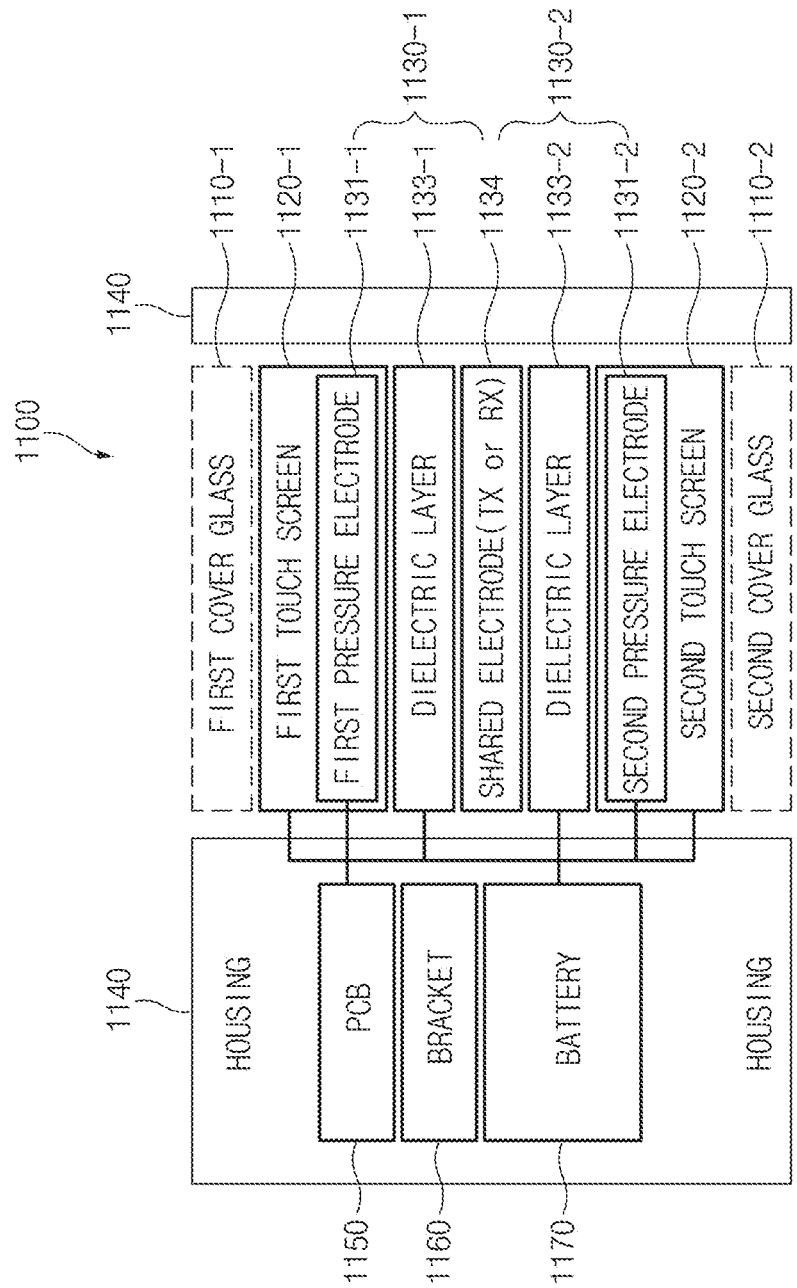
FIG. 11 is a view showing a section of an electronic apparatus according to an embodiment.

FIG. 11 is a view showing a section of an electronic apparatus according to an embodiment.

According to various embodiments of the present disclosure, a section of an electronic apparatus 900 shown in FIG. 11 may be one example of a section of the electronic apparatus 400 of FIG. 4 when viewed from the right-side direction 414 to the left-side direction 413 after taken along the line 10 crossing in the upper direction 415 and the lower direction 416. Referring to FIG. 11, the electronic apparatus 1100 may include a first cover glass 1110-1, a second cover glass 1110-2, a first touch screen 1120-1, a second touch screen 1120-2, a first pressure sensor 1130-1, a second pressure sensor 1130-2, a housing 1140, a printed circuit board (PCB) 1150, a bracket 1160, and a battery 1170. Since the remaining components except for the first and second touch screens 920-1 and 920-2 and the first and second pressure sensors 1130-1 and 1130-2 in the configuration shown in FIG. 9 are the same as or similar to those described with reference to FIG. 5, the following description will be focused on the difference.

According to an embodiment, the first pressure sensor 1130-1 may be arranged between the first and second touch screens 1120-1 and 1120-2 (or, in a lower direction from the first touch screen 1120-1). The first pressure sensor 1130-1 may sense the pressure of an external object (e.g., a user's finger, a stylus pen, or the like) on the first touch screen 1120-1. According to an embodiment, the first pressure sensor 1130-1 may be a capacitive pressure sensor. For example, the first pressure sensor 1130-1 may be a mutual capacitance type pressure sensor.

According to an embodiment, the first pressure sensor 1130-1 may include a first pressure electrode 1131-1, a first dielectric layer 1133-1, and a shared electrode 1134. According to an embodiment, the shared electrode 1134 may be shared by both the first and second pressure sensors 1130-1 and 1130-2. According to an embodiment, the first pressure sensor 1130-1 may apply a voltage to the first pressure electrode 1131-1 or the shared electrode 1134, and may sense the pressure of an external object based on the capacitance (or a variation in capacitance) formed between the first pressure electrode 1131-1 and the shared electrode 1134 by the applied voltage. According to an embodiment, the first pressure electrode 1131-1 may be arranged within the first touch screen 1120-1. For example, the first pressure electrode 1131-1 may be arranged to face the first dielectric layer 1133-1 within the first touch screen 1120-1. According to an embodiment, the first pressure electrode 1131-1 may be used as an electrode for sensing a touch on the first touch screen 1120-1. For example, the first touch screen 1120-1 may sense the touch of an external object based on the capacitance (or a variation in capacitance) formed between the first pressure electrode 1131-1 and the ground layer or the first touch electrode.

According to an embodiment, the second pressure sensor 1130-2 may be arranged between the first and second touch screens 1120-1 and 1120-2 (or, in an upper direction from the second touch screen 1120-2). The second pressure sensor 1130-2 may sense the pressure of an external object (e.g., a user's finger, a stylus pen, or the like) on the second touch screen 1120-2. According to an embodiment, the second pressure sensor 1130-2 may be a capacitive pressure sensor. For example, the second pressure sensor 1130-2 may be a mutual capacitance type pressure sensor.

According to an embodiment, the second pressure sensor 1130-2 may include a second pressure electrode 1131-2, a second dielectric layer 1133-2, and the shared electrode 1134. According to an embodiment, the second pressure sensor 1130-2 may apply a voltage to the second pressure electrode 1131-2 or the shared electrode 1134, and may sense the pressure of an external object based on the capacitance (or a variation in capacitance) formed between the second pressure electrode 1131-2 and the shared electrode 1134 by the applied voltage. According to an embodiment, the second pressure electrode 1131-2 may be arranged within the second touch screen 1120-2. For example, the second pressure electrode 1131-2 may be arranged to face the second dielectric layer 1133-2 within the second touch screen 1120-2. According to an embodiment, the second pressure electrode 1131-2 may be used as an electrode for sensing a touch on the second touch screen 1120-2. For example, the second touch screen 1120-2 may sense the touch of an external object based on the capacitance (or a variation in capacitance) formed between the second pressure electrode 1131-2 and the ground layer or the second touch electrode.

According to an embodiment, the shared electrode 1134 may be replaced with a ground layer (e.g., the ground layer 633 of FIG. 6). When the shared electrode 1134 is replaced with the ground layer, the first and second pressure sensors 1130-1 and 1130-2 may operate as a self-capacitance type pressure sensor. For example, the first pressure sensor 1130-1 may apply a voltage to the first pressure electrode 1131-1 and may sense the touch of an external object based on the capacitance (or a variation in capacitance) formed between the first pressure electrode 1131-1 and the ground layer by the applied voltage. As another example, the second pressure sensor 1130-2 may apply a voltage to the second pressure electrode 1131-2 and may sense the touch of an external object based on the capacitance (or a variation in capacitance) formed between the second pressure electrode 1131-2 and the ground layer by the applied voltage.

Figure 12A:
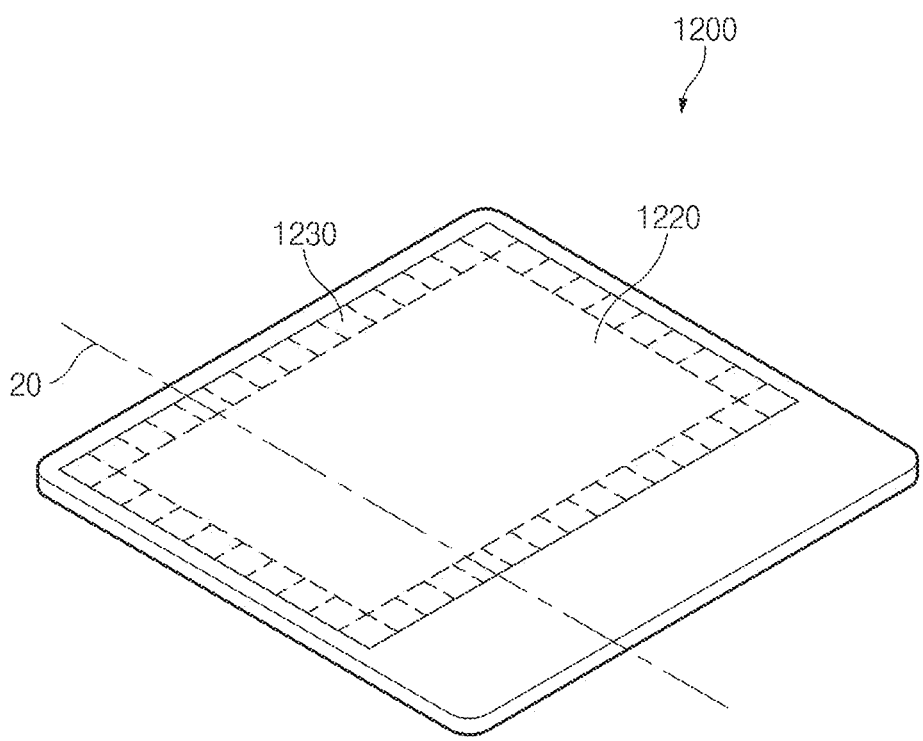
FIG. 12A illustrates an appearance of an electronic apparatus according to an embodiment.

FIG. 12A is a view showing an appearance of an electronic apparatus according to an embodiment.

Referring to FIG. 12A, in accordance with various embodiments of the present disclosure, an electronic apparatus 1200 may be identical or similar to the electronic apparatus 400 of FIG. 4 in appearance. According to an embodiment, the electronic apparatus 1200 may include a display (or a display apparatus) 1220. According to an embodiment, the display 1220 may include a cover glass, a display panel, a touch panel, a fingerprint sensor, a pressure sensor 1230, and the like. According to an embodiment, the pressure sensor 1230 may be a piezoelectric (or piezo) type pressure sensor. For example, the pressure sensor 1230 may include a piezoelectric element whose resistance varies with at least one pressure. When the resistance of the piezoelectric element is changed according to the pressure of an external object, the pressure sensor 1230 may sense the pressure of the external object based on a changed resistance value.

According to an embodiment, the pressure sensor 1230 may be arranged in the form of surrounding the display 1220 at the edge of the display 1220 when viewed from above the electronic apparatus 1200. According to various embodiments, the pressure sensor 1230 may include a plurality of pressure sensors arranged at specified locations that are spaced apart from each other by a specified interval. When the pressure sensors 1230 are arranged spaced apart from each other by a specified interval, it is possible to obtain coordinates at which pressure is applied according to the position of the piezoelectric element the resistance value of which is changed as well as the input value.

Figure 12B:
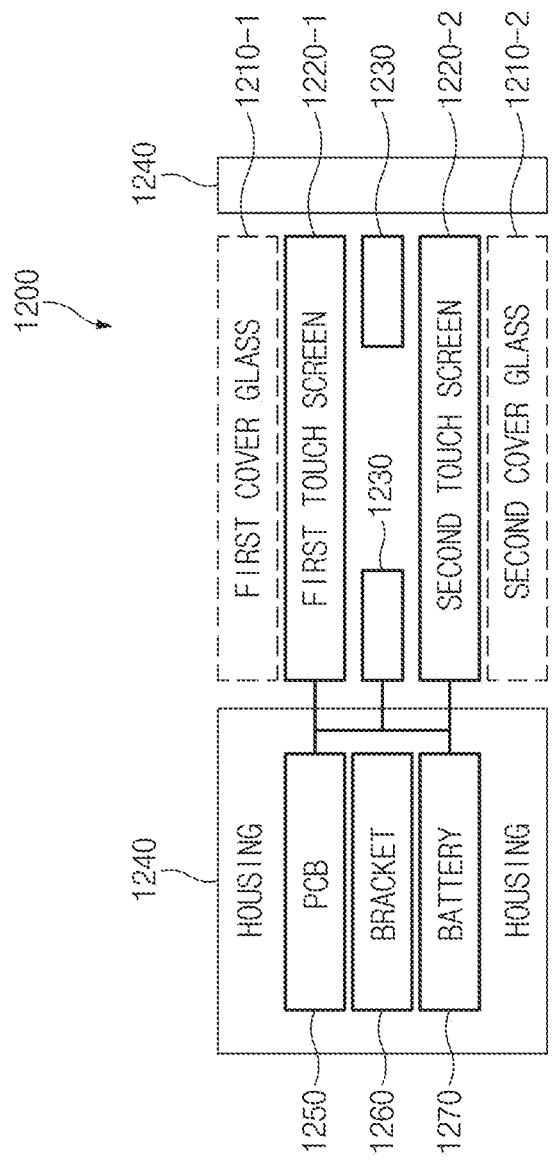
FIG. 12B is a view showing a section of an electronic apparatus according to an embodiment.

FIG. 12B is a view showing a section of an electronic apparatus according to an embodiment.

For example, a section of an electronic apparatus 1200 shown in FIG. 12B may be one example of a section of the electronic apparatus 1200 of FIG. 12A when viewed from right to left after taken along the line 20 crossing in the upper direction and the lower direction. Referring to FIG. 12B, the electronic apparatus 1200 may include a first cover glass 1210-1, a second cover glass 1210-2, a first touch screen 1220-1, a second touch screen 1220-2, the pressure sensor 1230, a housing 1240, a printed circuit board (PCB) 1250, a bracket 1260, and a battery 1270. Since the remaining components except for the pressure sensor 1230 in the configuration shown in FIG. 12B are the same as or similar to those described with reference to FIG. 5, the following description will be focused on the difference of the pressure sensor 1230.

According to an embodiment, the pressure sensor 1230 may be arranged between the first and second touch screens 1220-1 and 1220-2. The pressure sensor 1230 may sense the pressure of an external object (e.g., a user's finger, a stylus pen, or the like) on at least one of the first and second touch screen 1220-1 and 1220-2. For example, when the resistance of the piezoelectric element included in the pressure sensor 1230 is changed according to the pressure of the external object, the pressure sensor 1230 may sense the pressure of the external object based on the changed resistance value.

Figure 13:
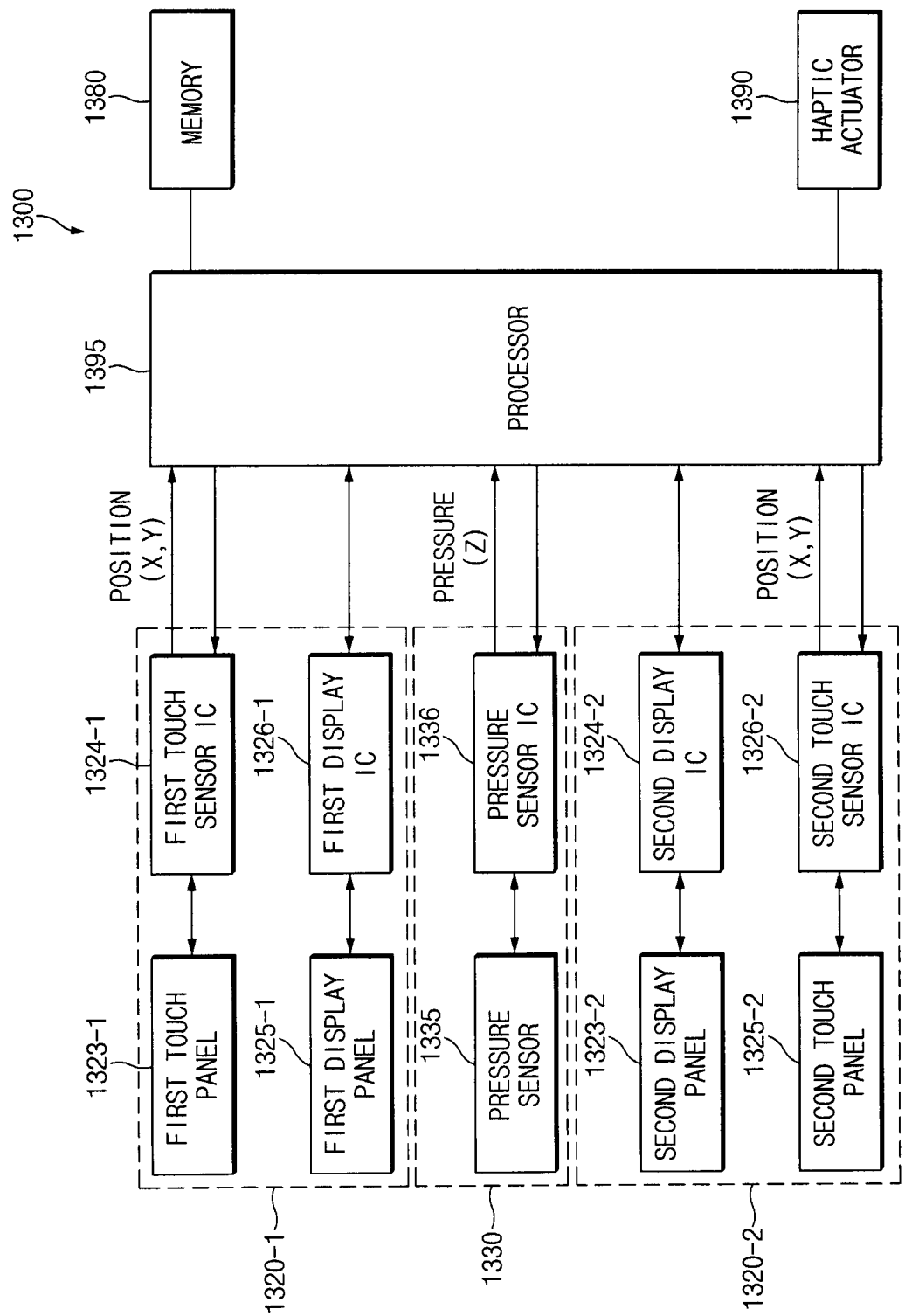
FIG. 13 illustrates a block diagram of an electronic apparatus according to an embodiment.

FIG. 13 illustrates a block diagram of an electronic apparatus according to an embodiment.

According to various embodiments of the present disclosure, referring to FIG. 13, an electronic apparatus 1300 (e.g., the electronic apparatus 400 of FIG. 4) may include a first touch screen 1320-1, a second touch screen 1320-2, a pressure sensor 1330, a memory 1380, a haptic actuator 1390, and a processor 1395.

According to an embodiment, the first touch screen 1320-1 may include a first touch panel 1323-1, a first touch sensor IC 1324-1, a first display panel 1325-1, and a first display IC 1326-1.

According to an embodiment, the first touch panel 1323-1 may change a physical quantity (e.g., voltage, light amount, resistance, charge amount, electrostatic capacity, or the like) specified by a user's touch. According to an embodiment, the first touch panel 1323-1 may be arranged to overlap the first display panel 1325-1. According to an embodiment, the first touch panel 1323-1 may include at least one touch electrode.

According to an embodiment, the first touch sensor IC 1324-1 may sense a change in the physical quantity in the first touch panel 1323-1, and may calculate the position (X, Y) at which the touch is made based on the change in the physical quantity. The calculated position (or coordinates) may be provided to the processor 1395. According to various embodiments, the first touch sensor IC 1324-1 may be referred to as a touch IC, a touch controller, or a touch controller IC. According to various embodiments, in an electronic apparatus not including the first touch sensor IC 1324-1, the processor 1395 may serve as the first touch sensor IC 1324-1. In addition, according to various embodi-ments, the first touch sensor IC 1324-1 and the processor 1395 may be implemented in one configuration (e.g., one-chip).

According to an embodiment, the first display panel 1325-1 may receive a video driving signal supplied from the first display IC 1326-1. The first display panel 1325-1 may display a user interface or various contents (e.g., text, image, video, icon, symbol, and the like) based on the image driving signal.

According to an embodiment, the first display IC (or the first display drive circuit (DDI)) 1326-1 may provide a video driving signal corresponding to video information received from the processor 1395 to the first display panel 1325-1 according to a preset frame rate. According to various embodiments, the first display IC 1326-1 may include a graphics RAM, an interface module, an image processing unit, a multiplexer, a display timing controller (T-con), a source driver, a gate driver, an oscillator, and the like.

According to an embodiment, the second touch screen 1320-2 may include a second touch panel 1325-2, a second touch sensor IC 1326-2, a second display panel 1323-2, and a second display IC 1324-2. Since the second touch panel 1325-2, the second touch sensor IC 1326-2, the second display panel 1323-2 and the second display IC 1324-2 may perform operations the same as or similar to those of the first touch panel 1323-1, the first touch sensor IC 1324-1, the first display panel 1325-1, and the first display IC 1326-1 included in the first touch screen 1320-1, respectively, the detailed description will be omitted.

According to an embodiment, the pressure sensor module 1330 (e.g., the pressure sensor 530 of FIG. 5) may include a pressure sensor 1335 and a pressure sensor IC 1336. The pressure sensor 1335 may detect the pressure (or force) applied to the first touch screen 1320-1 and/or the second touch screen 1320-2 by an external object (e.g., a finger or a stylus pen). According to an embodiment, by the touch of a user on the first touch screen 1320-1 and/or the second touch screen 1320-2, a physical quantity (e.g., capacitance, voltage or resistance) of the pressure sensor 1335 may be changed.

According to an embodiment, the pressure sensor IC 1336 may sense a change in the physical quantity at the pressure sensor 1335 and may calculate a pressure (Z) applied by the touch of a user based on the change in the physical quantity. The pressure value calculated by the pressure sensor IC 1336 may be provided to the processor 1395. According to an embodiment, when the pressure sensor IC 1336 senses the position at which the pressure is sensed together, the pressure value and the position (or coordinates of the pressure) at which the pressure is sensed may be provided to the processor 1395 together. According to various embodi-ments, the pressure sensor IC 1336 may be referred to as a force touch controller, a force sensor IC, a pressure panel IC, or the like.

According to an embodiment, the memory 1380 may store instructions or data associated with the operations of components included in the electronic apparatus 1300. For example, the memory 1380 may store instructions that, when executed, enable the processor 1395 to perform vari-ous operations described in the present disclosure.

According to an embodiment, when the haptic actuator 1390 senses a touch (including hovering or "force touch") or pressure from an external object, the haptic actuator 1390 may provide haptic feedback (e.g., vibration) to a user under control of the processor 1395. To this end, the haptic actuator 1390 may include a piezoelectric member, a vibra-tion plate, or the like.

According to various embodiments, the processor 1395 may be electrically coupled to other components included in the electronic apparatus 1300, for example, to execute operation or data processing associated with control and/or communication of components included in the electronic apparatus 1300. According to an embodiment, the processor 1395 (e.g., an application processor) may be implemented with a system-on-chip (SoC) including at least one processor (or a central processing unit (CPU)), a graphic processing unit (GPU), a memory, and the like.

According to an embodiment, the processor 1395 may activate or deactivate the first and second touch screens 1320-1 and 1320-2. For example, the processor 1395 may deactivate the first and second touch screens 1320-1 and 1320-2 in a sleep mode (or a low power mode). As another example, the processor 1395 may activate the first and second touch screens 1320-1 and 1320-2 when the operating mode of the electronic apparatus 1300 is changed from the sleep mode to an awake mode. For example, the operation mode of the electronic apparatus 1300 may be changed to the awake mode when a specified event (e.g., a power key input event or a notification event) occurs in the sleep mode.

According to an embodiment, the processor 1395 may sense a touch on one of the first and second touch screens 1320-1 and 1320-2 in a state where both the first and second touch screens 1320-1 and 1320-2 are activated. When the touch on one of the first and second touch screens 1320-1 and 1320-2 is sensed in the state where both the first and second touch screens 1320-1 and 1320-2 are activated, the processor 1395 may deactivate the other.

According to an embodiment, the processor 1395 may determine whether a touch is sensed through the first touch screen 1320-1 in a state where the first touch screen 1320-1 is activated and the second touch screen 1320-2 is deactivated. According to an embodiment, the processor 1395 may determine whether a pressure is sensed through the pressure sensor 1330 in a state where the first touch screen 1320-1 is activated and the second touch screen 1320-2 is deactivated. According to an embodiment, the processor 1395 may determine the direction in which the pressure is sensed, based on the touch sensing result and the pressure sensing result.

According to an embodiment, when the touch is sensed through the first touch screen 1320-1 and the pressure is sensed through the pressure sensor 1330, the processor 1395 may compare the coordinates at which the touch is sensed with the coordinates at which the pressure is sensed. When the coordinates at which the touch is sensed are the same as the coordinates at which the pressure is sensed, the processor 1395 may determine that the pressure of an external object on the first touch screen 1320-1 is sensed.

According to an embodiment, when the touch is sensed through the first touch screen 1320-1 and the pressure is sensed through the pressure sensor 1330, the processor 1395 may compare the coordinates at which the touch is sensed with the coordinates at which the pressure is sensed. When the coordinates at which the touch is sensed are different from the coordinates at which the pressure is sensed, the processor 1395 may determine that the pressure of an external object on the second touch screen 1320-2 is sensed.

According to an embodiment, when the touch is not sensed through the first touch screen 1320-1 and the pressure is sensed through the pressure sensor 1330, the processor 1395 may determine that the pressure of an external object on the second touch screen 1320-2 is sensed.

According to an embodiment, the processor 1395 may perform a corresponding operation based on at least one of touch coordinates, pressure intensity, pressure coordinates, and a pressure sensed direction.

Figure 14:
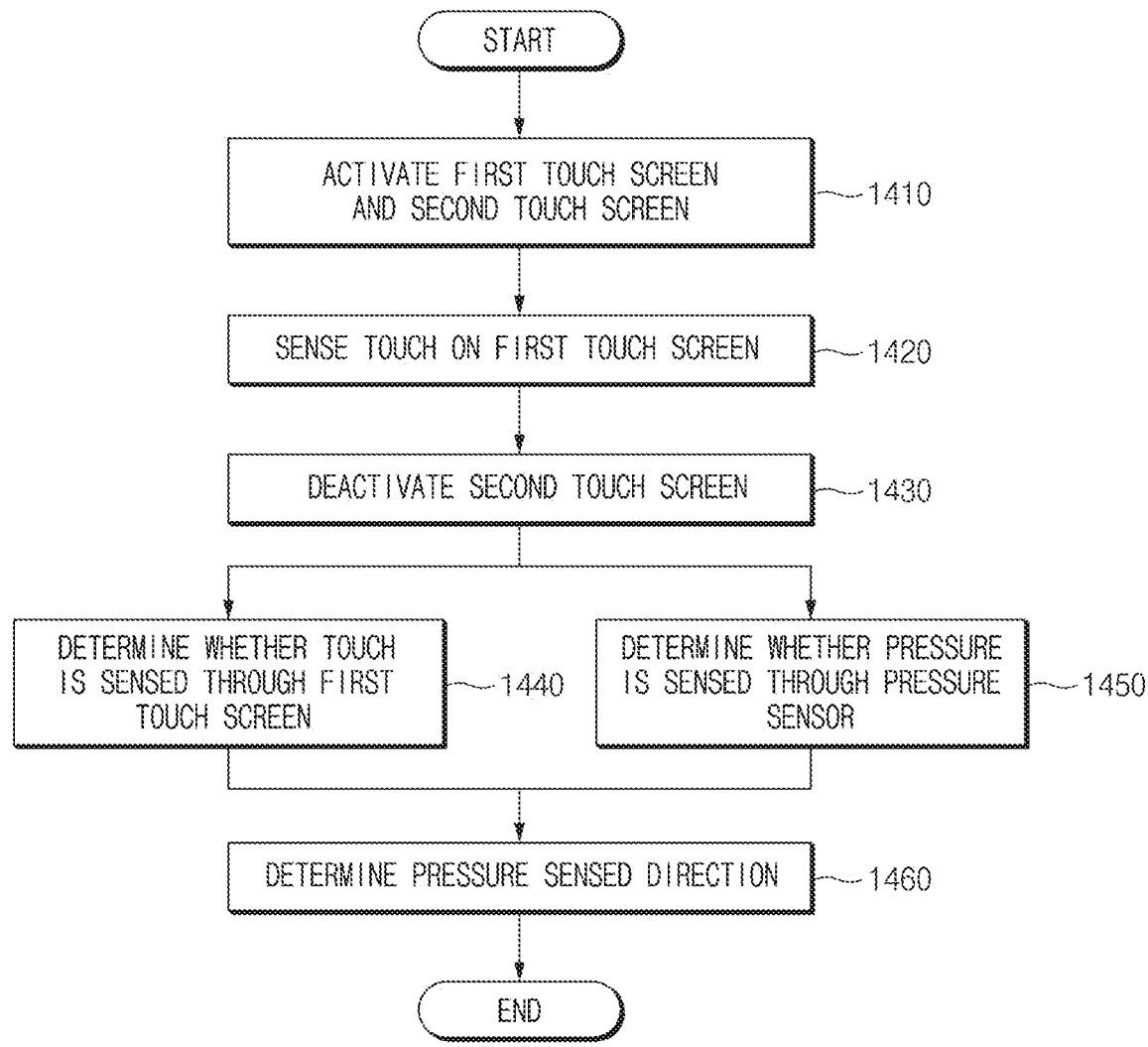
FIG. 14 is a flowchart illustrating a pressure sensing method of an electronic apparatus according to various embodiments.

FIG. 14 is a flowchart illustrating a pressure sensing method of an electronic apparatus according to various embodiments.

The flowchart shown in FIG. 14 may include operations that are processed in the above-described electronic apparatus (e.g., the electronic apparatus 1300). Therefore, even if omitted from the following description, the contents described about the electronic apparatus with reference to FIGS. 1 to 13 may be applied to the flowchart shown in FIG. 14.

According to an embodiment, in operation 1410, an electronic apparatus may activate a first touch screen (e.g., the first touch screen 1320-1 of FIG. 13) and a second touch screen (e.g., the second touch screen 1320-2 of FIG. 13). For example, the electronic apparatus may activate the first and second touch screens when the operating mode of the electronic apparatus changes from a sleep mode to an awake mode.

According to an embodiment, in operation 1420, the electronic apparatus may sense a touch on the first touch screen. According to an embodiment, when the touch on the first touch screen is sensed, in operation 1430, the electronic apparatus may deactivate the second touch screen. For example, when the touch on the first touch screen (e.g., an unlock operation for the first touch screen) is sensed, the electronic apparatus may determine that a user uses the first touch screen and may deactivate the second touch screen.

According to an embodiment, in operation 1440, the electronic apparatus may determine whether the touch is sensed through the first touch screen.

According to an embodiment, in operation 1450, the electronic apparatus may determine whether a pressure is sensed through a pressure sensor (e.g., the pressure sensor 1330 of FIG. 13).

According to an embodiment, in operation 1460, the electronic apparatus may determine the direction in which the pressure is sensed, based on the touch sensing result and the pressure sensing result. For example, when the touch is sensed through the first touch screen and the pressure is sensed through the pressure sensor, the electronic apparatus may compare the coordinates at which the touch is sensed and the coordinates at which the pressure is sensed. When the coordinates at which the touch is sensed are the same as the coordinates at which the pressure is sensed, the processor may determine that the pressure of an external object on the first touch screen is sensed. When the coordinates at which the touch is sensed are different from the coordinates at which the pressure is sensed, the processor may determine that the pressure of an external object on the second touch screen 1320-2 is sensed. As another example, when the touch is not sensed through the first touch screen and the pressure is sensed through the pressure sensor, the electronic apparatus may determine that the pressure of the external object on the second touch screen is sensed.

According to an embodiment, when a pressure sensed direction is determined, the processor may perform a corresponding operation based on at least one of touch coordinates, pressure intensity, pressure coordinates, and a pressure sensed direction.

The term "module" used in the present disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 120), may cause the one or more processors to perform a function corresponding to the instruction.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above components, or a part of the above components may be omitted, or additional other components may be further included. Operations performed by a module, a program module, or other components according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. An electronic apparatus comprising:
   a housing including a first surface facing in a first direction and a second surface facing in a second direction opposite to the first direction;
   a first touch screen display arranged between the first and second surfaces and exposed to an outside through the first surface;
   a second touch screen display arranged between the first and second surfaces and exposed to an outside through the second surface; and
   a single pressure sensor arranged between the first and second touch screen displays to sense a pressure of an external object on at least one of the first and second touch screen displays; and
   a processor configured to:
      determine, either the first touch screen display or the second touch screen display, as a touch screen display in use;
      deactivate the other touch screen display; and
      in response to the pressure of the external object, determine a direction from which the pressure is sensed based on a comparison of first coordinates at which the pressure is sensed and second coordinates at which a touch input to the touch screen display in use is sensed.

2. The electronic apparatus of claim 1, wherein the single pressure sensor includes:
   a first electrode arranged in parallel with the first touch screen display;
   a second electrode arranged in parallel with the first electrode in the second direction from the first electrode; and
   a dielectric layer arranged between the first and second electrodes.

3. The electronic apparatus of claim 1, wherein the single pressure sensor includes:
   an electrode arranged in parallel with the first touch screen display;
   a ground layer arranged in parallel with the electrode in the second direction from the electrode; and
   a dielectric layer arranged between the electrode and the ground layer.

4. The electronic apparatus of claim 1, wherein the single pressure sensor includes:
   an electrode arranged in parallel with the first touch screen display;
   a ground layer arranged within the second touch screen display electrode; and
   a dielectric layer arranged between the electrode and the ground layer.

5. The electronic apparatus of claim 1, wherein the first touch screen display at least partially overlaps the second touch screen display when viewed from above the first surface.

6. The electronic apparatus of claim 1, wherein:
   the processor is electrically connected to the first and second touch screen displays, and the at least one pressure sensor, and
   the processor is configured to:
      deactivate the second touch screen display when a touch is sensed by the first touch screen display in a state where the first and second touch screen displays are activated.

7. The electronic apparatus of claim 6, wherein the processor is further configured to:
   when the touch is sensed by the first touch screen display and a pressure is sensed by the single pressure sensor, compare a coordinate at which the touch is sensed with a coordinate at which the pressure is sensed; and
   determine that the pressure of the external object on the first touch screen display is sensed when the coordinate at which the touch is sensed is equal to the coordinate at which the pressure is sensed.

8. The electronic apparatus of claim 6, wherein the processor is further configured to:
   determine that the pressure of the external object on the second touch screen display is sensed when the second coordinates at which the touch is sensed is different from the first coordinates at which the pressure is sensed.

9. The electronic apparatus of claim 6, wherein the processor is further configured to:
   when the touch is not sensed by the first touch screen display and a pressure is sensed by the single pressure sensor, determine that the pressure of the external object on the second touch screen display is sensed.

10. A display apparatus comprising:
   a first touch screen display facing in a first direction;

a second touch screen display facing in a second direction opposite to the first direction;

a single pressure sensor arranged between the first and second touch screen displays to sense a pressure of an external object on at least one of the first and second touch screen displays; and a processor configured to:

determine, either the first touch screen display or the second touch screen display, as a touch screen display in use;

deactivate the other touch screen display; and in response to the pressure of the external object, determine a direction from which the pressure is sensed based on a comparison of first coordinates at which the pressure is sensed and second coordinates at which a touch input to the touch screen display in use is sensed.

11. The display apparatus of claim 10, wherein the single pressure sensor includes:

a first electrode arranged in parallel with the first touch screen display;

a second electrode arranged in parallel with the first electrode in the second direction from the first electrode; and a dielectric layer arranged between the first and second electrodes.

12. The display apparatus of claim 10, wherein the single pressure sensor includes:

an electrode arranged in parallel with the first touch screen display;

a ground layer arranged in parallel with the electrode in the second direction from the electrode; and a dielectric layer arranged between the electrode and the ground layer.

13. The display apparatus of claim 10, wherein the single pressure sensor includes:

an electrode arranged in parallel with the first touch screen display;

a ground layer arranged within the second touch screen display; and a dielectric layer arranged between the electrode and the ground layer.

14. The display apparatus of claim 10, wherein the first touch screen display at least partially overlaps the second touch screen display when viewed from above the first surface.

* * * * *